US008675119B2

(12) United States Patent
Nayar et al.

(10) Patent No.: US 8,675,119 B2
(45) Date of Patent: Mar. 18, 2014

(54) ADAPTIVE IMAGING USING DIGITAL LIGHT PROCESSING

(75) Inventors: Shree K. Nayar, New York, NY (US); Terrance E. Boult, Bethlehem, PA (US)

(73) Assignee: Trustees of Columbia University in the City of New York, New York, NY (US)

( * ) Notice: Subject to any disclaimer, the term of this patent is extended or adjusted under 35 U.S.C. 154(b) by 1927 days.

(21) Appl. No.: 10/486,291

(22) PCT Filed: Aug. 8, 2002

(86) PCT No.: PCT/US02/25176
§ 371 (c)(1),
(2), (4) Date: Sep. 25, 2006

(87) PCT Pub. No.: WO03/014796
PCT Pub. Date: Feb. 20, 2003

(65) Prior Publication Data
US 2011/0211077 A1    Sep. 1, 2011

Related U.S. Application Data

(60) Provisional application No. 60/311,158, filed on Aug. 9, 2001.

(51) Int. Cl.
*H04N 5/225* (2006.01)
(52) U.S. Cl.
USPC .......................................... 348/344; 348/362
(58) Field of Classification Search
USPC .................... 348/207.99, 362, 335, 340, 344; 250/201.1, 214 VT; 700/259; 358/302; 310/12.03; 359/291
See application file for complete search history.

(56) References Cited

U.S. PATENT DOCUMENTS

| | | | |
|---|---|---|---|
| 5,144,442 A | 9/1992 | Ginosar et al. | 358/209 |
| 5,212,555 A | 5/1993 | Stoltz | 358/206 |
| 5,327,286 A | 7/1994 | Sampsell et al. | 359/561 |
| 5,506,676 A | 4/1996 | Hendler et al. | 356/237 |
| 5,546,128 A * | 8/1996 | Nakagakiuchi et al. | 348/362 |
| 5,579,444 A * | 11/1996 | Dalziel et al. | 700/259 |
| 5,612,736 A | 3/1997 | Vogeley et al. | 348/207 |
| 5,789,737 A | 8/1998 | Street | 250/208.1 |
| 5,878,152 A | 3/1999 | Sussman | 382/106 |
| 5,940,204 A | 8/1999 | Hewlett | 359/298 |
| 6,069,352 A * | 5/2000 | Castracane et al. | 250/214 VT |
| 6,126,288 A | 10/2000 | Hewlett | 353/28 |

(Continued)

OTHER PUBLICATIONS

Kearney et al., "Characterization of a digital micromirror device for use as an optical mask in imaging and spectroscopy," Center for Imaging Science, Rochester Institute of Technology, 1998.*

(Continued)

*Primary Examiner* — Lin Ye
*Assistant Examiner* — Dennis Hogue
(74) *Attorney, Agent, or Firm* — Baker Botts L.L.P.

(57) ABSTRACT

A system (100) for the adaptive imaging of a scene includes a digital light processing apparatus (150) adapted for controllably reflecting an image of the scene in at least a first direction to thereby reflect an intensity modulated image of the scene along at least the first direction, an image detector (140) for detecting the intensity modulated image of the scene and generating corresponding image data, and an image data processor (154) for processing the image data into control data and providing the control data to the digital light processing (150) apparatus for control thereof.

33 Claims, 19 Drawing Sheets

(56) References Cited

U.S. PATENT DOCUMENTS

| | | | |
|---|---|---|---|
| 6,864,473 B2* | 3/2005 | Chretien et al. | 250/201.1 |
| 2002/0012064 A1* | 1/2002 | Yamaguchi | 348/362 |
| 2002/0063899 A1* | 5/2002 | Acharya et al. | 358/302 |

OTHER PUBLICATIONS

Castracane et al., "DMD-based bloom control for intensified imaging systems," SPIE Conference on Diffractive and Holographic Technologies, Systems, and Spatial Light Modulators VI, Jan. 1999.*

Jain, "Fundamentals of Digital Image Processing," Prentice Hall, 1989.*

Christensen et al. (2002) "Active-Eyes: an adaptive pixel-by-pixel image-segmentation sensor architecture for high-dynamic-range hyperspectral imaging", Applied Optics, 41: pp. 6093-6103.

Kearney et al. (2000) "Imaging spectroscopy with digital micromirrors", SPIE, vol. 3965: pp. 11-20.

S. K. Nayar et al. ,"High dynamic range imaging: Spatially varying Pixel exposures," Proc. of Computer Vision and Pattern Recognition'00 (2000).

M. Ben-Ezra, "Segmentation with Invisible Keying Signal," Proc. of CVPR, pp. 1 : 32-37 (2000).

T. Mitsunaga etal.,"Radiometric Self Calibration," 1 Proc. of Computer Vision and Pattern Recognition'99, pp. 374-380 (1999).

Castracane et al. (1999) "DMD-based bloom for intensified imaging systems", SPIE, vol. 3633: pp. 234-242.

Kearney et al. (1998) "Characterization of a digital micromirrir device for use as an optical mask in imaging and spectroscopy", SPIE, vol. 3292: pp. 81-91.

Brajovic et al. ,"A Sorting Image Sensor: An Example of Massively Parallel Intensity-to-Time Processing for Low-Latency Computational Sensors," Proc. of IEEE Conference on Robotics and Automation,pp. 1638-1643 (1996).

Japanese Patent 08-340486 to K. Saito (1996).

Malbet et al. (1995) "High-Dynamic-Range Imaging Using a Deformable Mirror for Space Coronography", Astronomical Society of the Pacific 107: pp. 386-398.

Japanese Patent No. 08-223491of H. Doi, et al.entitled"Image Sensor" (1986).

* cited by examiner

ADAPTIVE IMAGING USING DIGITAL LIGHT PROCESSING

CROSS-REFERENCE TO RELATED APPLICATIONS

This application is based on U.S. provisional patent application Ser. No. 60/311,158 filed Aug. 9, 2001, which is incorporated herein by reference for all purposes and from which priority is claimed.

BACKGROUND OF THE INVENTION

1. Technical Field

The present invention relates to techniques for digitally capturing and processing high dynamic range still and video images of a scene using relatively low resolution image detectors, and more particularly, to techniques capable of adaptively capturing and processing such images.

2. Background Art

In digital photography and video imaging, it is often necessary to capture images of a scene which includes areas of greatly disparate luminance. An extreme example lies in the imaging of a solar eclipse, where a nearly black object, the moon, is directly adjacent an extraordinarily bright object, the sun. Other more common examples include photographing a person with the sun in the background, videotaping a sporting event in the late afternoon hours where shadows are evident, and capturing images of a fireworks display.

In each of these examples, the range of luminance values needed to fully capture the scene is high, ranging from near black to extremely bright. As a typical image capture device, such as a charge-coupled device ("CCD") operates with eight bits of resolution, only 256 luminance values are available to span the entire brightness spectrum in such circumstances, and often yield a poor images. While higher dynamic range image sensors, such as sixteen bit CCDs, are commercially available, they come at an increased cost which may be undesirable, and regardless of scene brightness operate within a fixed dynamic range.

Accordingly, there have been several attempts to provide a technique for capturing and processing high dynamic range still and video images of a scene using relatively low resolution image detectors, such as the above-mentioned eight bit CCD. Those attempts may be generally grouped into sequential exposure change methods, techniques using multiple image detectors, approaches using multiple sensor elements within a pixel, adaptive pixel exposure techniques and methods employing spatially varying pixel exposures.

The most obvious approach is to sequentially capture multiple images of the same scene using different exposures. The exposure for each image is controlled by either varying the F-number of the imaging optics or the exposure time of the image detector. A high exposure image will be saturated in the bright scene areas but capture the dark regions well. In contrast, a low exposure image will have less saturation in bright regions but end up being too dark and noisy in the dark areas. The complementary nature of these images allows one to combine them into a single high dynamic range. Such an approach has been employed in Japanese Patent No. 08-223491 of H. Doi, et al. entitled "Image Sensor" (1986) and by others since then. The sequential exposure charge approach was subsequently extended by using acquired images to compute a radiometric response function of the imaging system, e.g., as described in T. Mitsunaga et al., "Radiometric Self Calibration," 1 *Proc. of Computer Vision and Pattern Recognition '99*," pp. 374-380 (1999).

Unfortunately, sequential exposure change techniques are inherently suited only to static scenes, and the imaging system, scene objects and their respective radiance levels must remain constant during the sequential capture of images under different exposures. If the images can be captured in quick succession, they can be merged to obtained high dynamic range images at a reasonable frame-rate, as described in U.S. Pat. No. 5,144,442 to R. Ginosar et al. However, the above noted constants must be maintained.

The stationary scene restriction faced by sequential capture may be remedied by using multiple imaging systems. This approach is described in the above mentioned Japanese Patent No. 08-223491, as well as in Japanese Patent 08-340486 to K. Saito (1996) and elsewhere. Beam splitters are used to generate multiple copies of the optical image of the scene. Each copy is detected by an image detector whose exposure is preset by using an optical attenuator or by changing the exposure time of the detector. While this approach is capable of producing high dynamic range images in real time, with both scene objects and the imaging system free to move during the capture process, a disadvantage is that this approach is expensive as it requires multiple image detectors, precision optics for the alignment of all the acquired images and additional hardware for the capture and processing of multiple images.

Another approach to high dynamic range imaging uses a different CCD design, where multiple sensor elements lie within a pixel. In this approach, each detector cell includes two sensing elements, i.e., potential wells, of different sizes and hence sensitivity. When the detector is exposed to the scene, two measurements are made within each cell and they are combined on-chip before the image is read out. Such an approach is proposed in U.S. Pat. No. 5,789,737 to R. A. Street, and elsewhere. However, this technique is also expensive as it requires a sophisticated detector to be fabricated. In addition, spatial resolution is reduced by a factor of two since the two potential wells take up the same space as two pixels in a conventional image detector. Further, the technique is forced to use a simple combining technique for the outputs of the two wells as it is done on-chip.

A further approach to high dynamic range imaging has been proposed in V. Brajovic et al., "A Sorting Image Sensor: An Example of Massively Parallel Intensity-to-Time Processing for Low-Latency Computational Sensors," *Proc. of IEEE Conference on Robotics and Automation*, pp. 1638-1643 (1996). There, a particular solid state image sensor is developed where each pixel on the device includes a computational element that measures the time it takes to attain full potential well capacity. Since the full-well capacity is the same for all pixels, the time to achieve it is proportional to image radiance. The recorded time values are read out and converted to a high dynamic range image. This approach faces the challenge of scaling to high resolution while keeping fabrication costs under control. In addition, since exposure times can be large in dark scene regions, the method is expected to be more susceptible to motion blur.

Finally, an approach to high dynamic range imaging using spatial variation of pixel sensitivity has been disclosed in S. K. Nayar et al., "High dynamic range imaging: Spatially varying Pixel exposures," *Proc. of Computer Vision and Pattern Recognition '00* (2000). Different (fixed) sensitivities are assigned to neighboring pixels on the image detector. An important feature here is the simultaneous sampling of spatial dimensions as well as the exposure dimension of image radiance: when a pixel is saturated in the acquired image, it is likely to have a neighbor that is not, and when a pixel produces zero brightness, it is likely to have a neighbor that produces non-zero brightness. Unfortunately, a trade-off of spatial resolution of an image is made in order to improve brightness resolution, or dynamic range. Moreover, the fixed pixel exposure values do not provide the ability to measure each image brightness with the best precision possible. Accordingly, there remains a need for an imaging technique which optimizes the dynamic range of a captured image of a scene, regardless of the dynamic range of the image sensor employed.

SUMMARY OF THE INVENTION

An object of the present invention is to provide an techniques for digitally capturing and processing high dynamic range still and video images of a scene using a relatively low dynamic range image detector.

Another object of the present invention is to provide techniques for digitally capturing and processing high dynamic range still and video images of a scene at reduced costs.

A further object of the present invention is to provide techniques capable of adaptively capturing and processing high dynamic range still and video images of a scene, regardless of the dynamic range of the image sensor employed.

Yet another object of the present invention is to provide techniques capable of adaptively capturing and processing high dynamic range still and video images of a scene using feedback from an image sensor to optimize such image capture and processing.

In order to meet these and other objects of the present invention which will become apparent with reference to further disclosure set forth below, the present invention discloses systems and methods for the adaptive imaging of a scene. In one exemplary embodiment, the system includes a controllable digital light processing apparatus adapted for reflecting an image of at least a portion of the scene in at least a first direction to thereby reflect an intensity modulated image of the scene along at least the first direction, an image detector for detecting the intensity modulated image of the scene and generating corresponding image data, and an image data processor for processing the image data into control data and providing the control data to the digital light processing apparatus.

In a preferred arrangement, the system also includes an image focusing device, e.g., a lens, positioned between the scene and the digital light processing apparatus, for focusing an image of the scene onto the digital light processing apparatus. A second lens may also be positioned between the image detector and the digital light processing apparatus.

In a highly preferred arrangement, the controllable digital light processing apparatus is a digital micromirror device, and the image detector is a CCD camera. The image data processor may be either a general purpose computer including software, or take on a hardware implementation. Advantageously, the system may include a second a digital image detector positioned to receive a modulated image from the digital light processing apparatus along a second direction of reflection. The system may also include a beam splitter for splitting the modulated image and two digital image detectors, or alternatively, a second controllable digital light processing apparatus to generate a further modulated image of the scene. Thus, systems with cascading digital micromirror devices are presented.

In an alternative embodiment, the present invention provides a system for adaptively imaging a scene including a controllable digital light processing apparatus, image detector, an image processing apparatus, and an image focusing device. The image focusing device is positioned between the scene and the digital light processing apparatus, and focuses an image of the scene onto the controllable digital light processing apparatus. In this arrangement, the image data processor processes a detected image with filter data to generate final image data from the detected image data. Preferably, such processing involves the convolution of raw image data with filter data.

The present invention also provides methods for controlling the adaptive imaging of a scene using an N-level digital light processing apparatus adapted for controllably reflecting an image of at least a portion of the scene in at least one direction to thereby reflect an intensity modulated image of the scene in that direction. One exemplary method includes the steps of (a) setting a digital light processing apparatus control signal corresponding to a portion of the scene to an initial level N; (b) taking a first measurement of scene energy at one or more points corresponding to the scene portion using the initial control signal; (c) revising the control signal to a second level using the first measurement; (d) taking a second measurement using the revised control signal; (e) determining whether the second measurement is below a threshold value; (f) if it is, updating the control signal to a third level using the second measurement; and (g) taking a third measurement using said updated control signal.

The accompanying drawings, which are incorporated and constitute part of this disclosure, illustrate preferred embodiments of the invention and serve to explain the principles of the invention.

Figure 1:
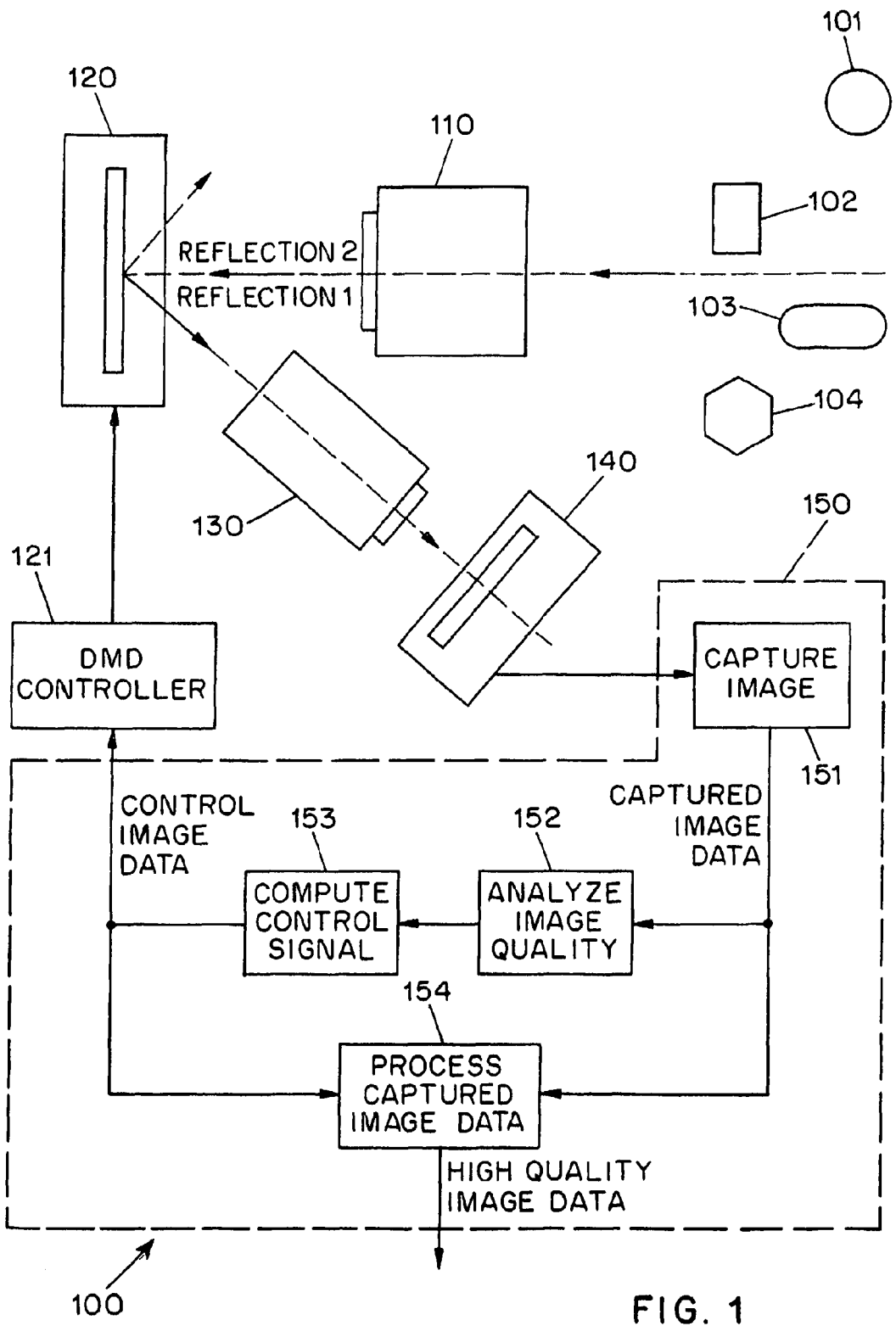
FIG. 1 is a functional diagram of an exemplary system in accordance with the present invention.

Throughout the Figs., the same reference numerals and characters, unless otherwise stated, are used to denote like features, elements, components or portions of the illustrated embodiments. Moreover, while the present invention will now be described in detail with reference to the Figs., it is done so in connection with the illustrative embodiments.

DETAILED DESCRIPTION OF THE PREFERRED EMBODIMENTS

Referring to FIG. 1, an exemplary system 100 for adaptive imaging enabling high quality imaging using a relatively low quality image detector is shown. A scene consisting of a very bright object 101, a very dark object 102, a bright object 103 and a dark object 104 is to be recorded. The exemplary system includes an image focusing device 110, a digital light processing apparatus 120, a relay lens 130, an image detector 140, and an image data processor 150 for processing image data and providing feedback to a digital light processing apparatus controller 121.

The image focusing device 110 is positioned to focus the image of the scene on to the a digital light processing apparatus 120. The device may be a lens, such as off the shelf imaging lens suitable for use with a conventional camera and of a focal length suitable for use with the desired field of view and the optics of the digital light processing apparatus 120. The relay lens 130 is positioned to receive one of two possible reflected images from the digital light processing apparatus 120 and to focus that image onto image detector 140. The lens 130 may also be an the shelf imaging lens, should be of a focal length suitable for use with the optics of the digital light processing apparatus 120 and image detector 140.

The type of imaging and relay lenses used are not critical to the present invention, and thus other commercially available or custom built lenses may be used. In addition, the lenses may be replaced with alternative image formation mechanisms such as pinhole, or omitted entirely. Likewise, while the image detector 140 used in the exemplary embodiment is an eight-bit CCD, other image detectors, such as CMOS detector, a microbolometer, or even a photomultiplier may be employed.

As shown in FIG. 1, the image data processor 150 is used to process image data and provide feedback to the controller 121. The processor may be implemented in either hardware or software, as further described below. In either case, the captured image 151 is analyzed for quality 152 to generate control image data 153 which is fed to the digital light processing apparatus to modulate the intensity of light falling on the detector 140. A second captured image 151 and the previously applied control image data 153 are then used to compute a high quality image 154 of the scene.

In the example shown in FIG. 1, a scene is expected to have a very high dynamic range in terms of radiance values, such as including a very bright and dark objects 101, 102, and other bring and dark objects 103, 104. An initially captured image can be analyzed by appropriate software 150 to detect and dark intensity pixels corresponding to scene points that lie outside the dynamic range of the image detector 140. The radiance from the corresponding scene points is then modulated using a digital light processing apparatus 120 to ensure that they produce image measurements that lie within the measurable range of the detector 140. Then, the captured image and the control image are used to compute a final image that has an extended dynamic range.

Figure 2:
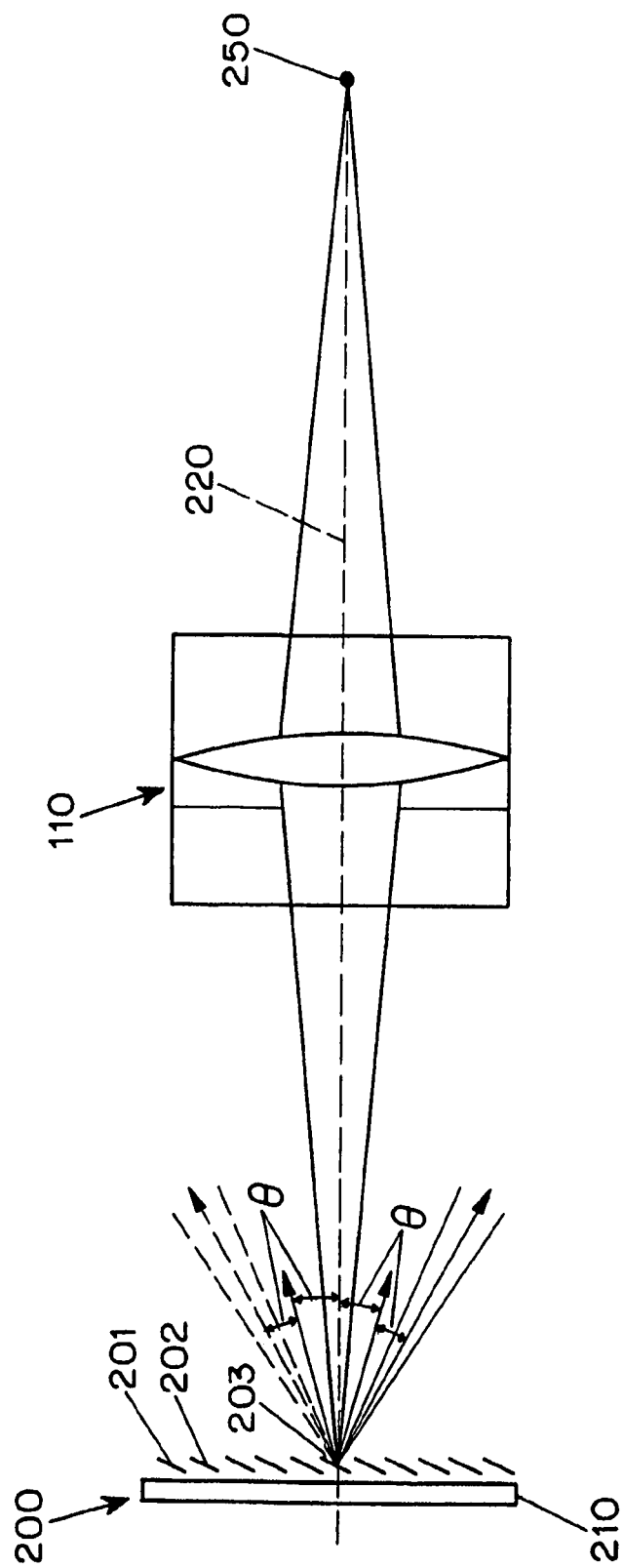
FIG. 2 is an illustrative diagram showing the reflection of light rays in a digital micromirror device.

In a preferred embodiment, the digital light processing apparatus 120 is a commercially available digital micromirror device ("DMD"). Referring to FIG. 2, the operation of a DMD 200 will be explained. A very large number of movable micromirrors 201, 202 reside on the surface 210 of the DMD. Each micromirror 101, 102 is able to switch at a rapid frequency between two tile angles (shown as φ) on either side of the optical axis 220. The ratio of the time periods a DMD micromirror is at the two tilt angles is proportional to the intensity of the control signal applied to that micromirrror. Therefore, the modulation of the light reflected in each of the two directions if a function of the control signal. In FIG. 2, a scene point 250 is imaged onto a single micromirror 203. The micromirror 203 serves as the location of a virtual scene point whose intensity is determined as the product of the radiance of the scene point and the modulation level for the micromirror. The complete DMD therefore acts like a mirror with controllable local reflectivity.

A DMD is only one of several possible apparatus for digitally modulating the imaged light energy. Other digital light processing apparatus which utilize controllable reflective surfaces to modulate an incident light source, e.g., by reflecting light in more than one direction or by reducing the energy of reflected light, may be utilized.

Figure 3:
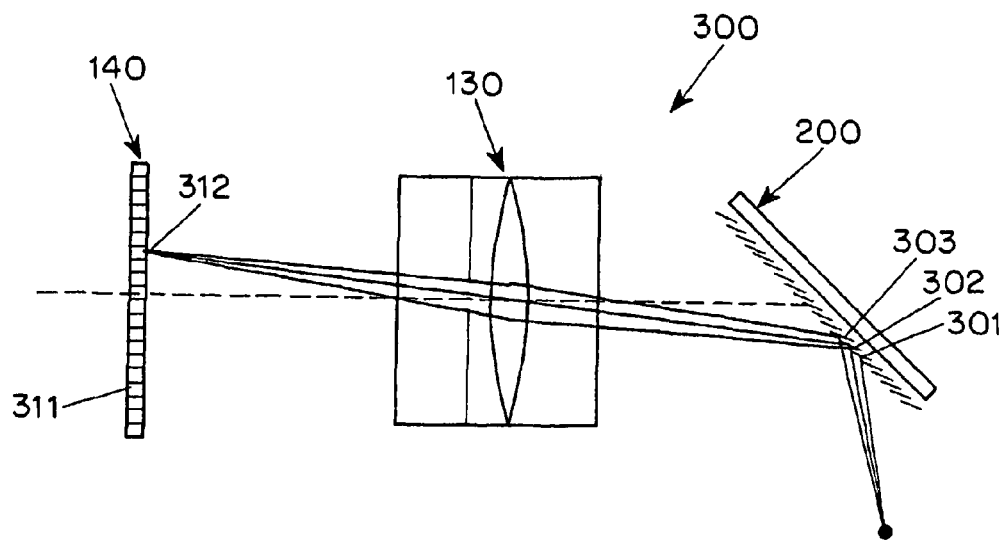
FIG. 3 is a functional diagram of an exemplary system in accordance with one exemplary embodiment of the present invention.

Referring next to FIG. 3, an embodiment 300 suitable for low resolution spatial image modulation will be explained. When a DMD is placed in front of an image, it can be used to modulate the imaged light rays. In this case, given a finite imaging aperture, a neighborhood of micromirrors 301, 302, 303 (rather than a single one) modulate the radiance of a scene point before it is imaged by a pixel 312 on the detector 140. Therefore, the irradiance of the pixel can be controlled by controlling a set of micromirrors, rather than a single one. In this case, the effective modulation function ends up being smooth or blurred, and the irradiance at any given pixel 311 cannot be controlled without effecting the irradiances of neighboring pixels.

In many applications smooth modulation functions will suffice and hence this configuration is a useful one. For instance, when the modulator is used to compensate for smoothly radiometric effects such as vignetting, low-resolution modulation is sufficient. Even in applications such as HDR imaging, significant improvements in image quality can be achieved by adjusting the effective exposures of local neighborhoods of pixels rather than individual pixels.

Figure 4:
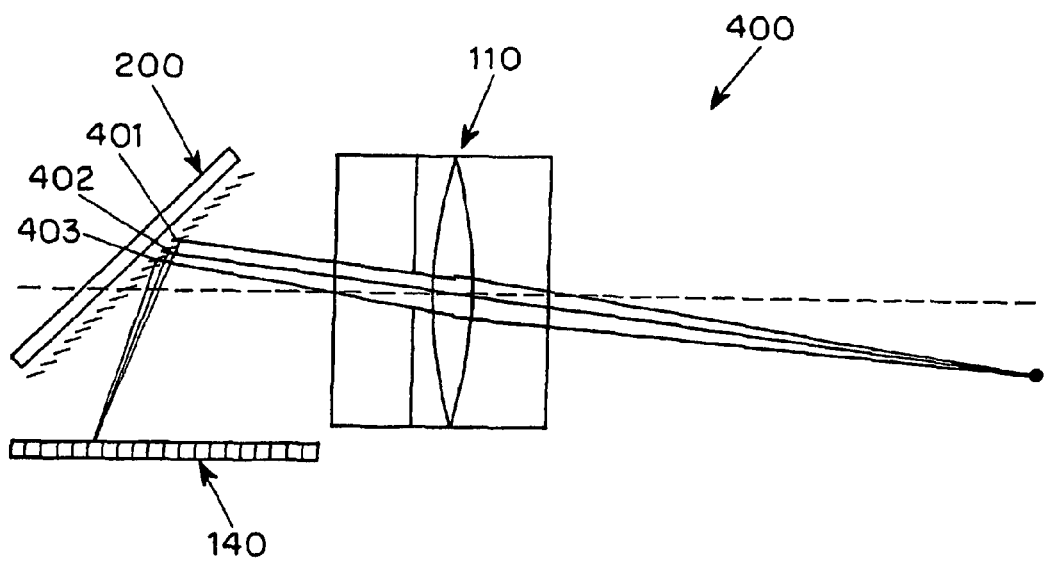
FIG. 4 is a functional diagram of an exemplary system in accordance with a second exemplary embodiment of the present invention.

As shown in FIG. 4, an alternative arrangement 400 suitable for low resolution spatial image modulation will be explained. In FIG. 4, a DMD 200 is placed between the imaging lens 110 and the image detector 140. In this case, the DMD 200 serves to modulate as well as redirect the imaged light rays towards the image detector, again using a neighborhood of micromirrors 401, 402, 403 corresponding to a scene point. Again, only smooth modulation signals can be achieved with this embodiment.

Figure 5:
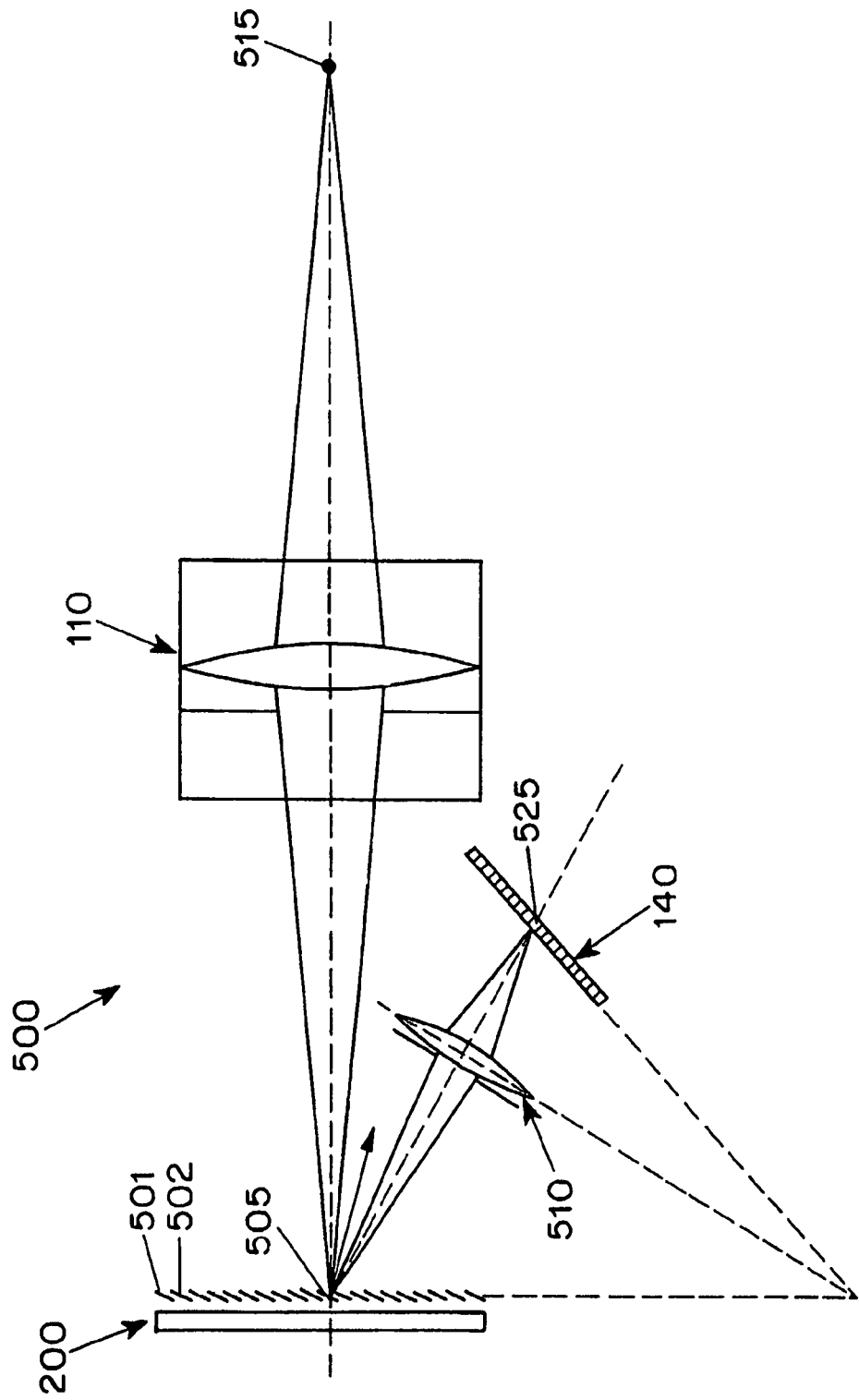
FIG. 5 is a functional diagram of an exemplary system in accordance with a third exemplary embodiment of the present invention.

Referring next to FIG. 5, an preferred embodiment 500 suitable for high resolution spatial image modulation will be explained. In this embodiment, the scene is imaged onto the DMD 200, where the DMD plane is frontal, i.e., perpendicular to the optical axis of the imaging lens. When the micromirrors 501, 502, n, are located on a frontal plane, they are all oriented at one of the two possible tilt angles with respect to the plane. Each scene point is focused onto a single micromirror. For example, the light cone behind the lens 110 corresponding to a scene point 515 is reflected by the corresponding micromirror 505. Therefore, the micromirror serves as a virtual scene point that is located on the DMD plane. A relay lens 510 is then used to re-image the virtual scene point that is located on the DMD plane onto a single pixel on the image detector 140, e.g., the virtual scene point located on mircomirror 505 is re-imaged onto pixel 525. Since the light cones are reflected by the DMD 200 at an angle with respect to the normal of the plane of the DMD, the image detector must be titled with respect to the optical axis of the re-imaging lens to obtain a focused imaged. The tile angle of image detector is easily determined from the focal length of the re-imaging lens and the location of the DMD plane using the Schiemflug condition.

In the embodiment shown in FIG. 5, the light energy received by each pixel on the detector 140 can be modulated without effecting the light received by neighboring pixels. Therefore, the modulation function used for a scene can be of a resolution that is matched with the resolution of the captured image.

In FIG. 5, the DMD 200 may be of a significantly higher resolution than the image detector 140. In such cases, advanced filtering and processing functions can be performed by software 150 at an intra-pixel level to achieve super resolution spatial image modulation. Such techniques will be addressed below.

Figure 6:
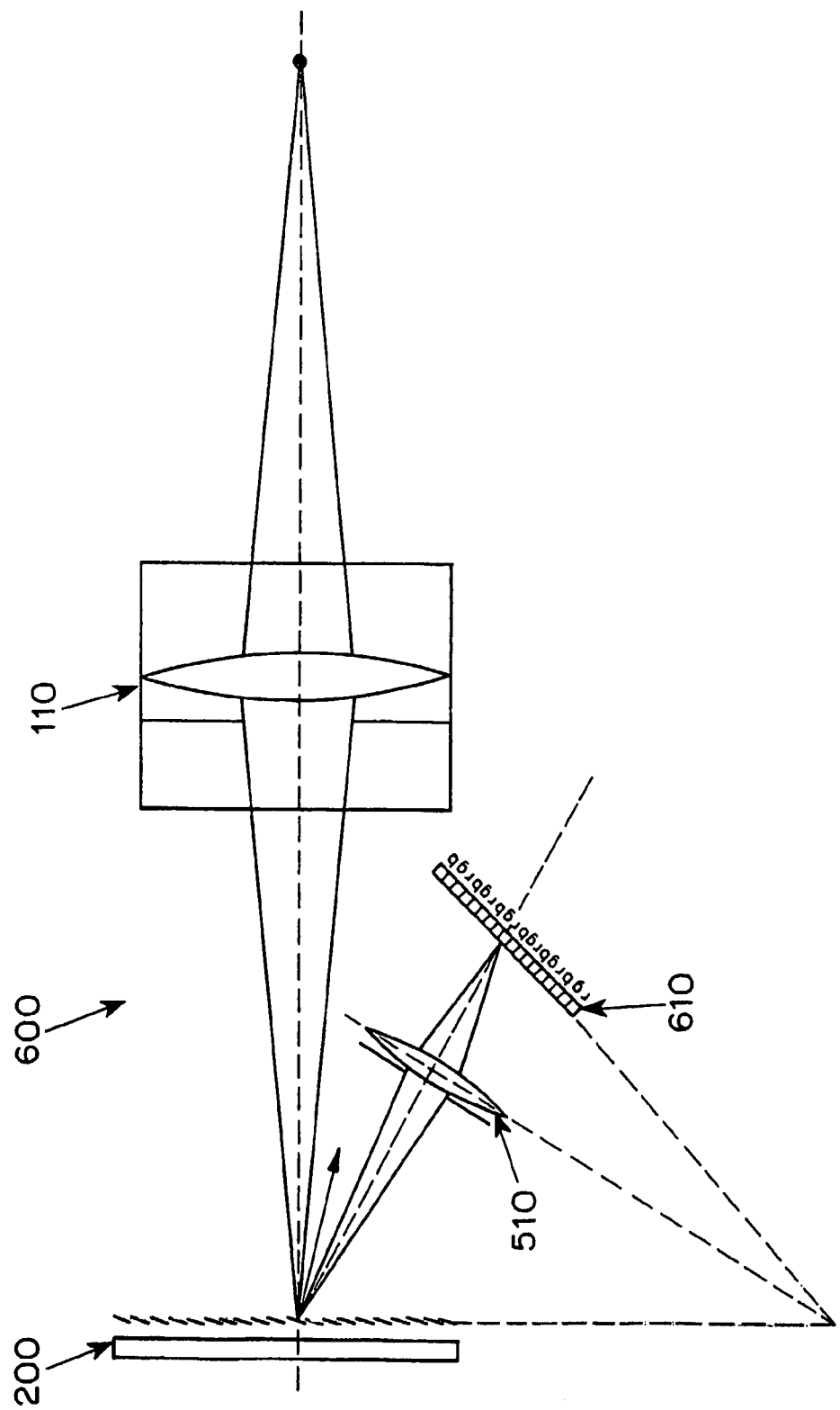
FIG. 6 is a functional diagram of an exemplary system in accordance with a fourth exemplary embodiment of the present invention.

Referring next to FIG. 6, an embodiment 600 suitable for non-homogeneous image sensing will be explained. The embodiment is identical to that shown in FIG. 5, except that the image detector 140 is replaced by detector 610 adapted for a non-homogeneous pixel sensitivity to the various characteristics of light, e.g., color, spectrum brightness, or polarization. For example, a detector with a Bayer color mosaic may be used. Since the dynamic range of each pixel can controlled independently, the non-homogeneous nature of the detector is not an issue. The captured high quality data can be used to compute a high dynamic range color image.

Such non-homogeneous sensing is not restricted to color; the pixels may have different brightness sensitivities, e.g., as disclosed in S. K. Nayar et al., "High dynamic range imaging: Spatially varying Pixel exposures," *Proc. of Computer Vision and Pattern Recognition* '00 (2000), the contents of which are incorporated by reference herein, or different polarization sensitivities, e.g., as described in M. Ben-Ezra, "Segmentation with Invisible Keying Signal," *Proc. of CVPR*, pp 1:32-37 (2000), the contents of which are incorporated herein. Those skilled in the art will appreciate that other non-homogeneous image sensors may likewise be employed.

Figure 7:
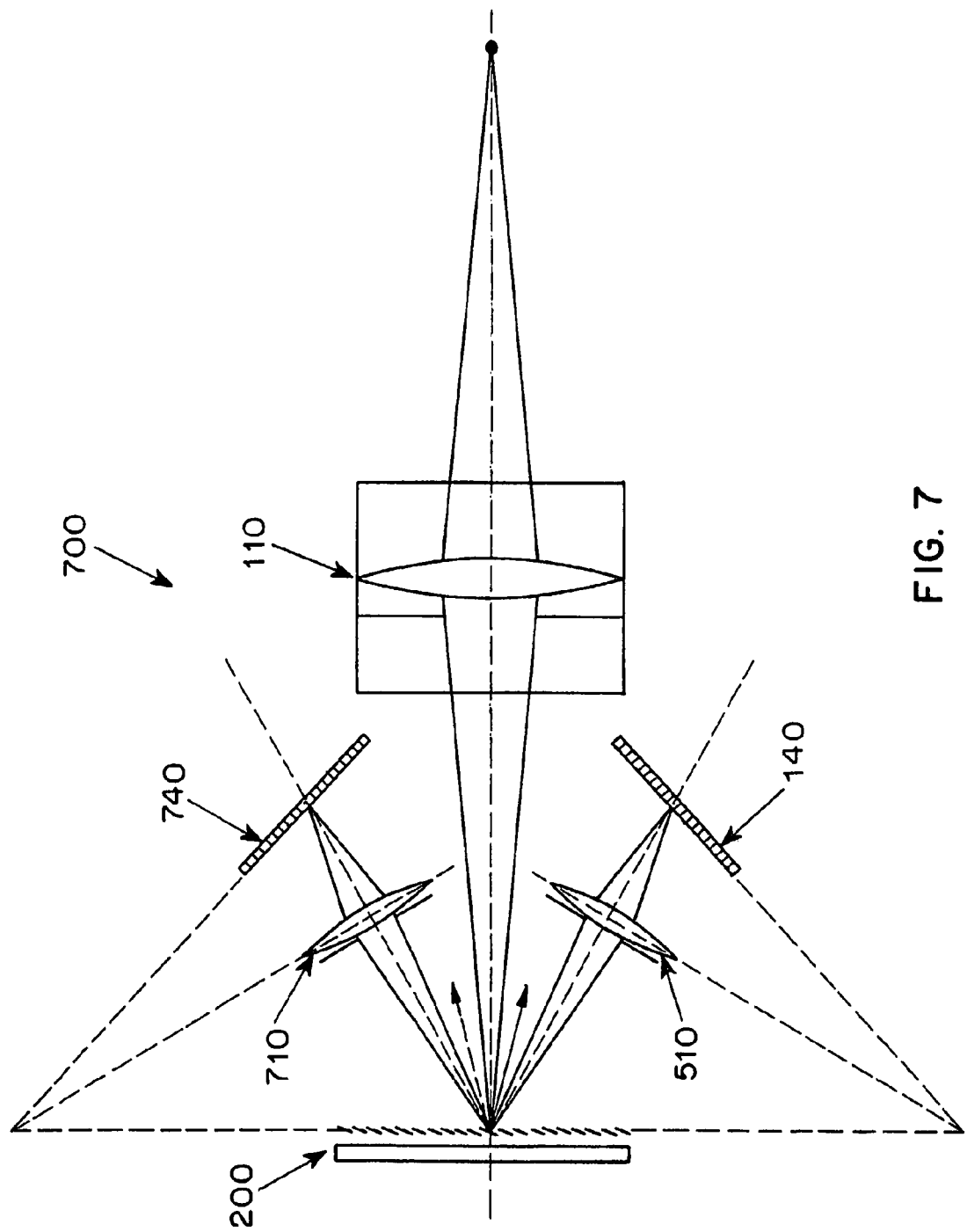
FIG. 7 is a functional diagram of an exemplary system in accordance with a fifth exemplary embodiment of the present invention.

Referring next to FIG. 7, an alternative embodiment 700 using multiple detectors will be explained. In this embodiment, the DMD 200 modulates light by reflecting incident light in two directions. The arrangement is identical to that of FIG. 5, except that an additional lense 710 and image detector 740 are included, this time along the second axis of reflection from the DMD.

If a control image with uniform brightness is applied to the DMD 200 (see FIG. 1), the images received by the two detectors will have effective exposure values that are determined by the brightness value of the control image. This allows simultaneously captured of two images with different effective exposures. These two images can then be used more effectively to compute a control signal that is sent to the DMD controller to achieve high quality image data. For instance, for a given scene point, if one detector produces a saturated brightness value, the corresponding brightness produced by the second detector will likely not be saturated and hence can be used to compute the control signal. The initial control image does not have to be constant one. A variety of modulation patterns may be used depending on the goals of the application.

Alternatively, the arrangement of FIG. 7 may be employed without use of a control signal by using the DMD 200 as a beam splitter. For instance, if a constant control image is provide, two detectors have different exposure values that are uniform over the image. A weighted average of these two captured images will yield an image with greater dynamic range than either of the two detectors. In this beam-splitting configuration, additional filters may be introduced in the optical paths of the two detectors. These could be spectral, neutral density, and polarization filters. Likewise, beam splitting using a single DMD is not restricted to a spatially uniform control image. More sophisticated control images may be used based on the needs of the application. Thus, the advantage of employing a DMD 200 as a beam-splitter in the arrangement of FIG. 7 is that it is programmable and hence flexible.

Figure 8:
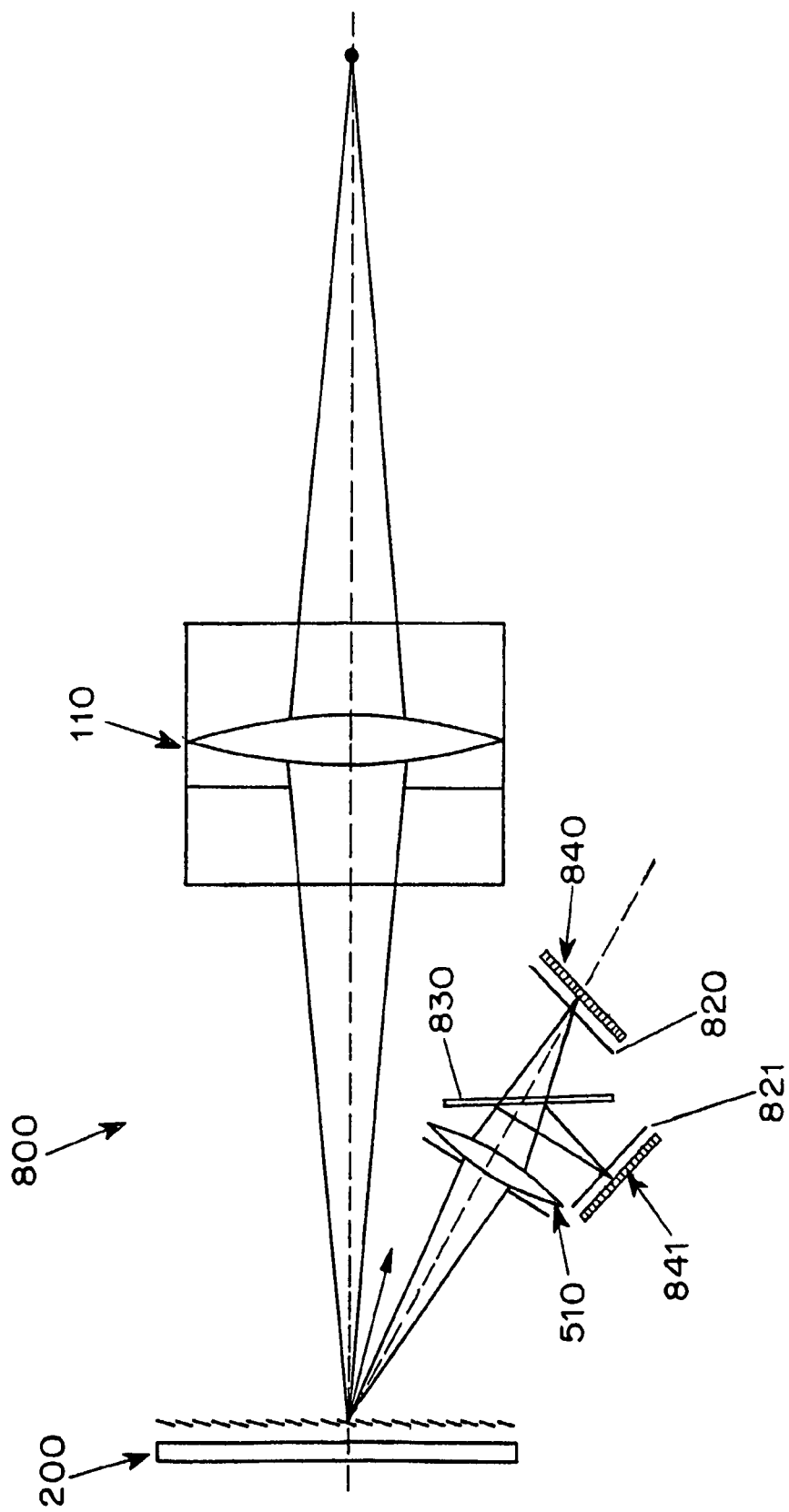
FIG. 8 is a functional diagram of an exemplary system in accordance with a sixth exemplary embodiment of the present invention.

In a similar manner, the arrangement of FIG. 5 may be modified so multiple image detectors are used to sense imaged based on one DMD reflection direction. For example, in the arrangement 800 show in FIG. 8., a partially transmitting beam splitter 830 may be used to relay the reflected image from the lens 510 to two detectors, 840, 841, each having a different radiance sensitivity, via optical filters 820, 821. Such an arrangement may be helpful in speeding up convergence of the control signal applied to the DMD 200.

Figure 9:
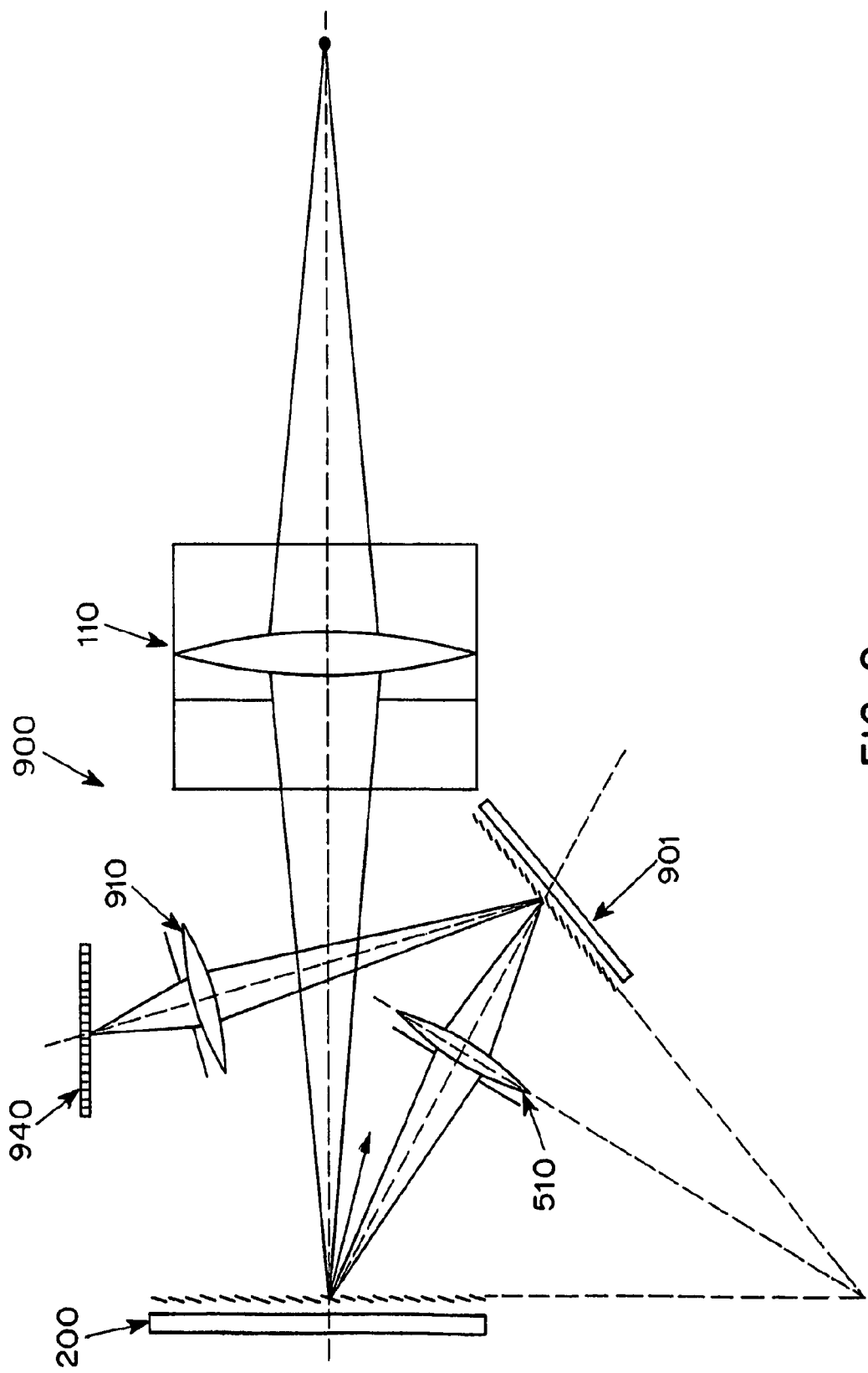
FIG. 9 is a functional diagram of an exemplary system in accordance with a seventh exemplary embodiment of the present invention.

Referring next to FIG. 9, an alternative embodiment 900 using cascaded image modulators will be explained. The arrangement is similar to FIG. 5, except that the detector 140 is replaced by a second DMD 901, with an image detector 940 positioned to receive one reflection from the DMD 901 through an additional lens 910. With this arrangement, incoming light can be modulated with greater precision that as shown in FIG. 5. Since each DMD has a limited number of quantization levels with respect to its modulation of light, the use of multiple DMDs serves to increase the number of modulation quantization levels. In the case of high dynamic range imaging, this results in a greater dynamic range when compared to a system that uses a single DMD.

Figure 10:
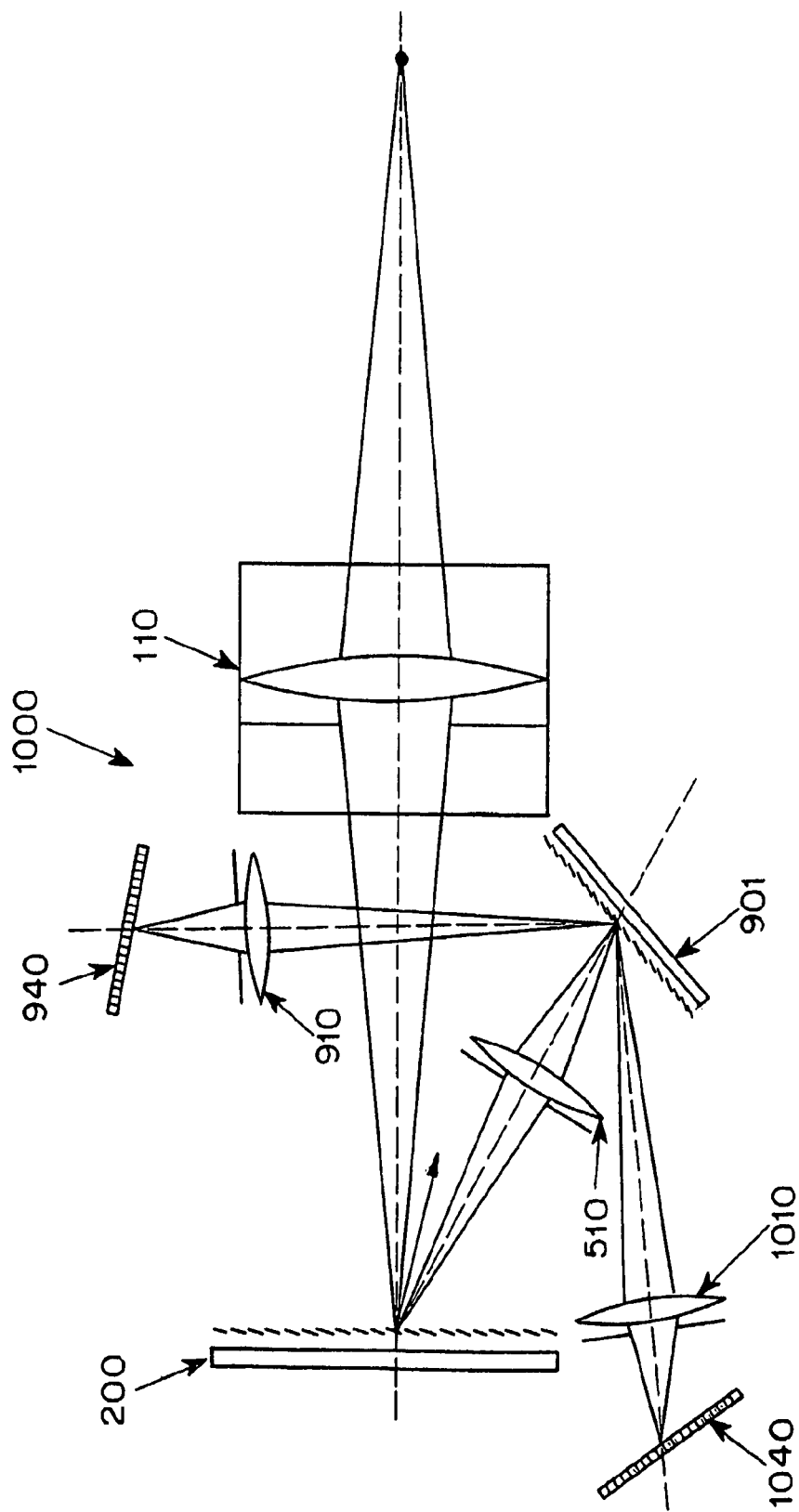
FIG. 10 is a functional diagram of an exemplary system in accordance with a eighth exemplary embodiment of the present invention.
Figure 11:
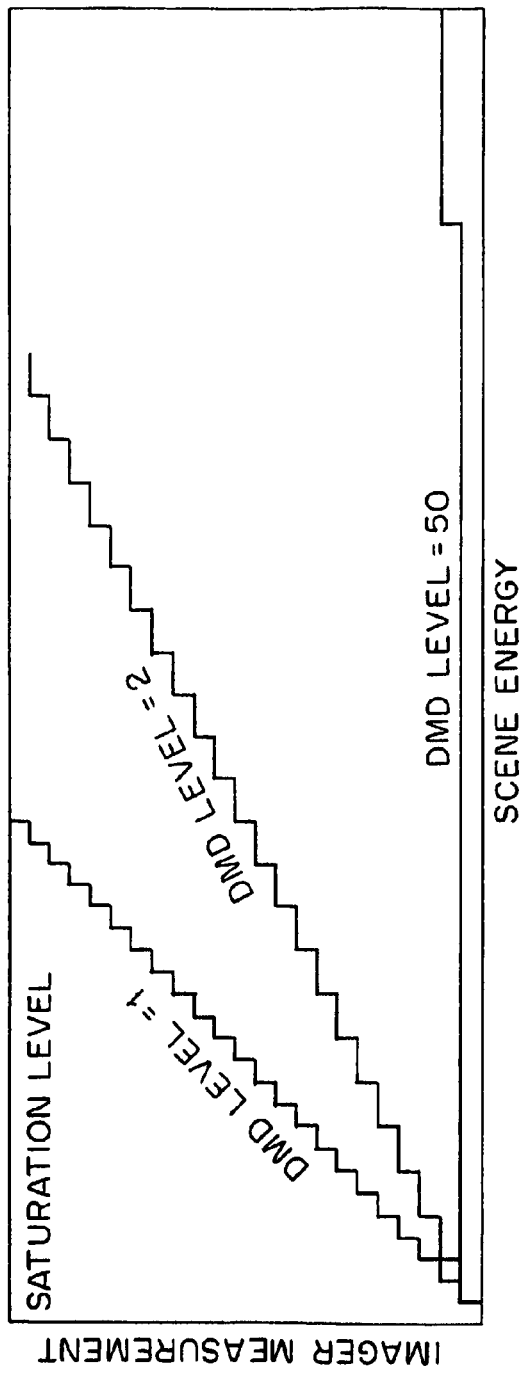
FIG. 11 is a graph plotting image measurement against scene energy for various digital micromirror device levels.

Further alternative arrangements using cascaded image modulators may be constructed, such as the system 1000 shown in FIG. 10. For example, the configuration shown in FIG. 9 can be further enhanced by using two image detectors 940, 1040 and two additional lenses 910, 1010, to image the light rays reflected by the second DMD 901, along its two reflection directions:

Referring to FIG. 11, the control of the DMD 200 will next be explained. At the pixel level, DMD modulation enables deflection of scene energy either into an image sensor or away from it. The amount of measured energy varies linearly with the amount of time the DMD is deflecting light into the sensor, which may be referred to as the primary activation time ("PAT") for the sensor. In the following disclosure concerning DMD control, it should be understood that a DMD is capable of being operated at N different levels, each level being responsive to $\log_2 N$ of received control information, and that the smallest resolvable time unit is t. As shown in FIG. 11, a DMD level of one provides the longest PAT, with increasing levels decreasing the PAT.

Commercially available DMD devices have switching times of 2 usec with stabilized switching at 15 usec. Thus, for a 30 frame-per-second ("fps") cameras, current DMDs can theoretically provide scalings from 1 down to 1/2200. DMD controllers usually provide 3 input channels with 8 bits per channel for a total of 24 control bits, with higher bit controllers being developed. Each channel is Pulse Code Width Modulated to provide 256 temporal levels per channel. As each channel adds to the PAT in a linear manner, 768 levels of scaling are available without the need to modify existing 8 bits per channel devices.

In the foregoing, the number of levels of scaling shall be more generally referred to as N. Let φ be the scaling associated with the PAT. For the two image detector configurations, e.g., FIG. 8, the second detector will receive energy not directed at the primary detector, hence it will receive energy for 33 ms-PAT, and have scaling 1-φ.

Letting the scene energy at a point be E(u, v), in an idealized sensor adaptive high dynamic range, the associated value in the 8-bit imager I(x, y) will be as in Eq. 1:

$$I(x,y) = \min(\lfloor r_{xy}(\phi, E(u,v)) \rfloor, 255) \quad (1)$$

where $r_{xy}$ is the pixel response function. This is idealized since equation (1) does not take into account noise or inter-pixel influences. In an ideal CCD sensor, the function $r_{xy}$ is linear. For a non-linear response, a radiometric calibration may be performed to determine $r_{xy}$. To simplify the discussion below, assume that $r_{xy}$ is linear or has been linearized by mapping with $r_{xy}^{-1}$.

Let v correspond to the scene energy which for level=N results in a measurement equal to 255–1. This is the maximum meaningful measurement the system can make. If a measurement I(x, y) can be made with control signal set at C(x, y), then if no saturation occurs, i.e. I(x, y)<255), then the associated scene energy s, satisfies Eq. 2:

$$\frac{I(x,y)+1}{255} \cdot \frac{v \cdot C(x,y)}{N} \geq s \geq \frac{I(x,y)}{255} \cdot \frac{v \cdot C(x,y)}{N} \quad (2)$$

an approximation to the energy is O(x,y)=I(x,y)C(x,y), which has a quantization separation of $$\frac{v \cdot C(x,y)}{255 \cdot N} \quad (3)$$

which bounds the accuracy of the measurement of its dynamic range.

Ignoring noise and issues introduced from non-linear response functions, the quantization separation can be decreased, and hence the measure resolution increased, if the control signal is reduced to the smallest value that does not result in saturation of the CCD. Accordingly, the control algorithm has multiple goals, including (a) the production of an image on the CCD array that neither causes saturation nor non-measurable (zero) levels, (b) insuring convergence even in a rapidly changing scene, (c) allowing mixing of the control signal and a measured image to produce an image with a larger dynamic level and minimum quantization error for each measurement. Additional goals may include (d) the production of a measurement image I(x, y) which is directly useful, i.e. it has large dynamic range but does not require combination with the control signal for human interpretation, (e) for stationary pixels, enabling the combing of measured images to further decrease the quantization error in intensity, (f) the implementation of a user desired intensity remapping function, (g) the ability to image "dark" objects even if some pixels saturate, and (h) ensuring that bright objects are not saturated even if dark objects are somewhat poorly quantized.

In order to control intensity, the mapping between the pixels in the modulation device and the pixels in the imaging sensor must be determined. This mapping can be determined by the precise manufacturing of the device, or after construction by a calibration process.

Figure 12:
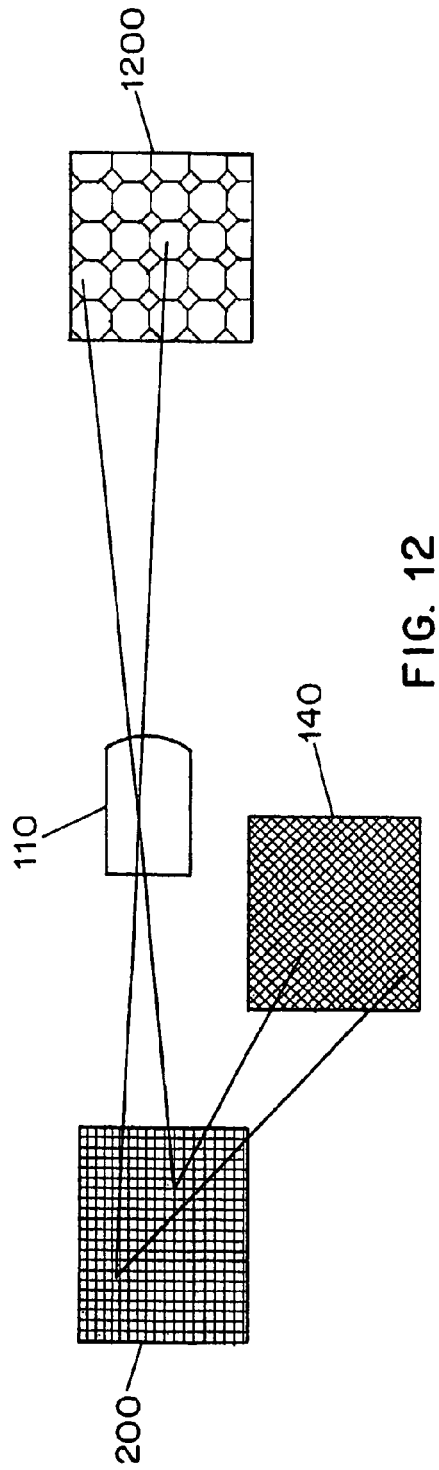
FIG. 12 is an illustrative diagram showing the mapping between an imaging sensor and a digital micromirror device.

An exemplary calibration process is shown in FIG. 12, where an image of a structured input is used to estimate mapping parameters. The mapping may be approximated as an affine transform, a perspective transform, or a general point-to-point mapping. To determine the association, a calibration patterns 1200 is projected into the camera 140. For example, a binary stripe pattern in each of x and y directions may be used. Rotating over many such patterns one can "encode" the pixels location by the when it measures light and dark patterns. For each pattern in the world (or entering the optics), the DMD control could then be varied via an orthogonal binary stripe pattern and images collected. With this approach the full mapping can be computed from the resulting $\log_2 255 \cdot \log_2 N$ images.

Note that at the pixel level, the mapping will not necessarily be a bijection, as a high resolution sensor, having an imaging resolution greater than that of the DMD, could be employed. In such a case, a single DMD pixel will influence many image pixels. The control of these systems is similar to that discussed, except that the maximum pixel in the CCD that corresponds to the DMD will be the determining factor for the control algorithm.

However, in the more typical scenario, multiple modulation pixels are associated with an imaging pixel, and the calibration process will need to provide a relative weighting. In this case, it is likely that some modulation pixels will also be associated with multiple image pixels, and the control algorithm would be modified to set the "shared" pixels to a value half way between the sharing pixels' desired control signals, and any pixel's with influence whole within the imaging pixel would be increased/decreased to adjust for this impact of the shared pixels. In the following discussion, it will be presumed that each control pixel C(x, y) is associated with a modulation pixel D(x, y), with the understanding that coordinate transforms could be applied if needed for more complex scenarios.

As indicated above, the control software 150 may implement either closed loop or open loop control over the imaging process. An advantage of open-loop control in that it does not require real-time feedback from the imaging sensor. One approach to open loop control is to obtain the distortion map R(x, y), using models of what is to be corrected, e.g. variation in measured brightness due to lens effects such as vignetting. Each pixel in this map is the reciprocal of the expected attenuation in the distortion. A more general approach is to compute, using a calibration phase, a distortion map. One example is to correct spatially varying sensor response effects. This can be accomplished by providing uniform intensity input, e.g. from an integrating sphere, and sequencing through all control signal to determined the value for each pixel that will result in the desired "flat" image.

Given a control map from the calibration phase, the map can be applied without run time feedback and without introducing any delay. Multiple maps may be stored, allowing corrections, e.g. when a lens is changed, or to apply to different desired intensity levels. However, such open-loop control does not insure that the image does not contain saturating pixels.

Figure 13:
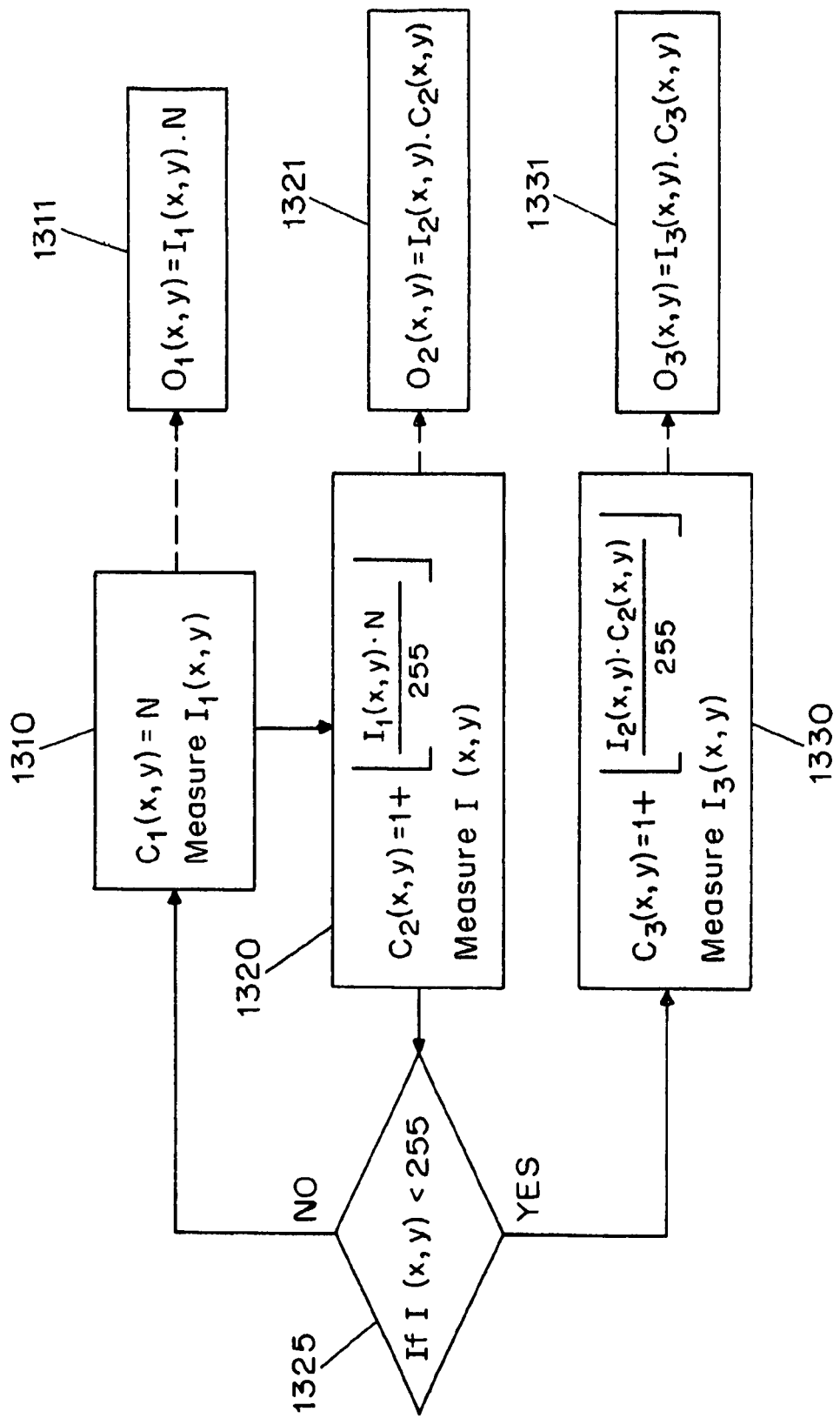
FIG. 13 is a flow diagram showing the primary pixel control technique in accordance with an exemplary embodiment of the present invention.

Referring next to FIG. 13, a technique for adaptively controlling a single imaging sensor with an image focused on a DMD will be explained. In the following, it is assumed that both the pixel level alignment is known, and the response function is linearized. It should be noted that the final image is processed 154 from the product of the measured and control images, i.e. $O(x, y)=I(x, y)*C(x, y)$, where $I(x, y)\epsilon[0,255]$ and $C(x, y)\epsilon[0, N]$. From this it should be clear that larger values of the control signal C, for the same measured image brightness $I(x,y)$, are associated with brighter scene points. Also, for a fixed scene brightness, larger values of the control signal $C(x,y)$ produce smaller measured values $I(x,y)$, with $C(x,y)=N$ producing the smallest measurable signals. This implies that there are multiple control algorithms that could produce the same measured output. While an exemplary control algorithm will be described, any algorithm that produces an equivalent configuration would suffice.

The fundamental part of the control algorithm is the computation of a scale that will reduce the measured value $I(x, y)$ below saturation. The maximum measurable scene energy corresponds to setting the $\phi=T$, or the DMD timing to level N, a measurement represented as $I_1(x, y)$. If a pixel saturates at this setting, then the corresponding scene point cannot be accurately measured, and is not considered a true measurement.

As shown in FIG. 13, the primary control method is based on a three-step imaging sequence, 1310, 1320, 1330. The method generates a valid output at every time instance and hence is stable. An initial image is captured 1310 with control signal $C_1(x, y)=N$, or $\phi=T$, yielding a measurement of $I_1(x, y)$ which is output 1311. The associated scene energy, s, satisfies $$\frac{I_1(x, y) + 1}{255} \cdot \frac{v \cdot C_1(x, y)}{N} \geq s \geq \frac{I_1(x, y)}{255} \cdot \frac{v \cdot C_1(x, y)}{N}. \tag{4}$$

which has a quantization separation of $$\frac{v \cdot C_1(x, y)}{255 \cdot N} \frac{v}{255} \tag{5}$$

If $I_1(x, y)<255-1$ then the measurement accuracy can be increased and a second image is captured 1320 and output 1321 by setting the level of the control signal for the second measurement, $C_2(x, y)$ to $$C_2(x, y) = \left\lfloor \frac{I_1(x, y) \cdot C_1(x, y)}{255} \right\rfloor + 1 = \left\lfloor \frac{I_1(x, y) \cdot N}{255} \right\rfloor + 1 \tag{6}$$

which will result in a measurement $I_2(x, y)$ that satisfies $$\frac{I_2(x, y) + 1}{255} \cdot \frac{v \cdot C_2(x, y)}{N} \geq s \geq \frac{I_2(x, y)}{255} \cdot \frac{v \cdot C_2(x, y)}{N} \tag{7}$$

which has a quantization separation of $$\frac{v \cdot C_2(x, y)}{N} \approx \frac{v \cdot \frac{I_1(x, y) \cdot N}{255}}{255 \cdot N} = \frac{v \cdot I_1(x, y)}{255 \cdot 255} \tag{8}$$

If N=256, so that all available levels in the DMD are not being used, then with two levels one can acquire a high quality image for each pixel. As an example let us assume $I_1=11$, in which case $O_1=2816$. Then $$C_2 = \left\lfloor \frac{2816}{255} \right\rfloor + 1 = 12.$$

Upon capture of the second image, which has the value, $I_2=239$, then $O_2=2868$.

If N>255, then the possible control values for $C_2(x, y)$ does not include all possible control signal levels and hence the estimation can be improved by setting the control signal according to the second measurement to define control signal for a third measurement 1330 which is output 1331 by setting $$C_3(x, y) = \left\lfloor \frac{I_2(x, y) \cdot C_2(x, y)}{255} \right\rfloor + 1 \approx \left\lfloor \frac{I_2(x, y) \cdot I_1(x, y) \cdot N}{255 \cdot 255} \right\rfloor + 1 \tag{9}$$

$$\frac{I_3(x, y) + 1}{255} \cdot \frac{v \cdot C_3(x, y)}{N} \geq s \geq \frac{I_3(x, y)}{255} \cdot \frac{v \cdot (C_3(x, y) + 1))}{N}. \tag{10}$$

which has a quantization separation of $$\frac{v \cdot C_3(x, y)}{255 \cdot N} \approx \frac{v \cdot I_2(x, y) \cdot I_1(x, y)}{255 \cdot 255 \cdot 255} \tag{11}$$

Figure 14:
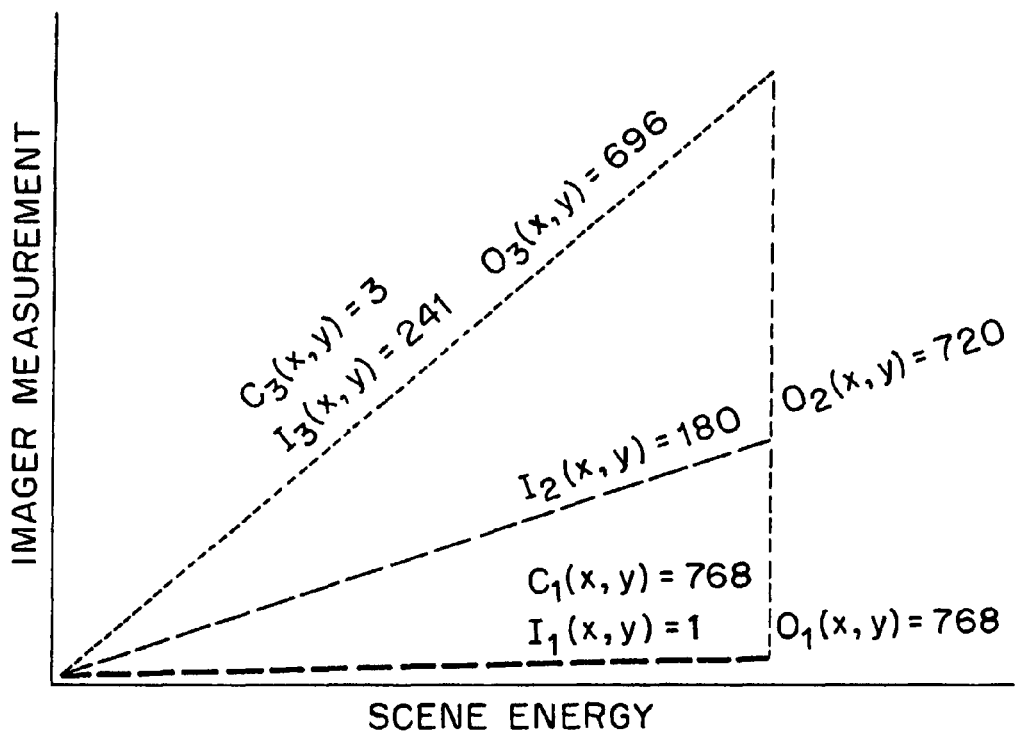
FIG. 14 is a graph plotting image measurement against scene energy for the technique of FIG. 13.

Referring to FIG. 14, an example of the three step process of FIG. 13, where N=768, is shown. Let the first measured image provide $I_1=1$, in which case $O_1=768$. Then $$C_2 = \left\lfloor \frac{768}{255} \right\rfloor + 1 = 4.$$

For the second image, which has the value $I_2=180$, then $O_2=720$, and $$C_3 = \left\lfloor \frac{720}{255} \right\rfloor + 1 = 3.$$

With this control signal, $I_3=241$ and may be used to compute an output $O_3=696$.

This method can handle modulators with up to 64 k levels. As DMD controllers are currently anticipated to be limited to a maximum of a few thousand levels, a three stage primary control should be sufficient. If digital modulates are developed with N>255·255, then the possible values for $C_3(x, y)$ would still not include all possible control values and another step would be needed. In general, this primary control algorithm requires K steps where K is the smallest integer such that $N<=(255)^K$.

If the underlying scene energy does not change, the method is stable as it is deterministic and has no feedback loop. But since the underlying scene energy is presumed to be dynamic, the measurements need to be tested. Thus, at 1325, if $I_k(x, y)==255$ then step 1310 is repeated. Thus the dynamic method is guaranteed to converge only if the scene energy does not continuously change by More than 255 levels within the 2 or 3 time frames needed to complete the process (e.g. 100 ms). If it fluctuates with a high amplitude with a frequency above that rate, the method may loop between steps 1310 and 1320. Note that while fluctuating the algorithm will still have an approximate brightness for each point, it is just that the accuracy of that measurement will fluctuate.

The method of FIG. 13 guarantees convergence to an intensity estimate within three steps. Unfortunately, that method requires commencing at step 1310 for each individual pixel, at making up to three separate measurements 1310, 1320, 1330 for each such pixel. However, in many situations the scene will not undergo fast or high dynamic range variations. that require commencing at the first step 1310 for every pixel. Instead, for most pixels in most images the temporal variation will be small.

Figure 15:
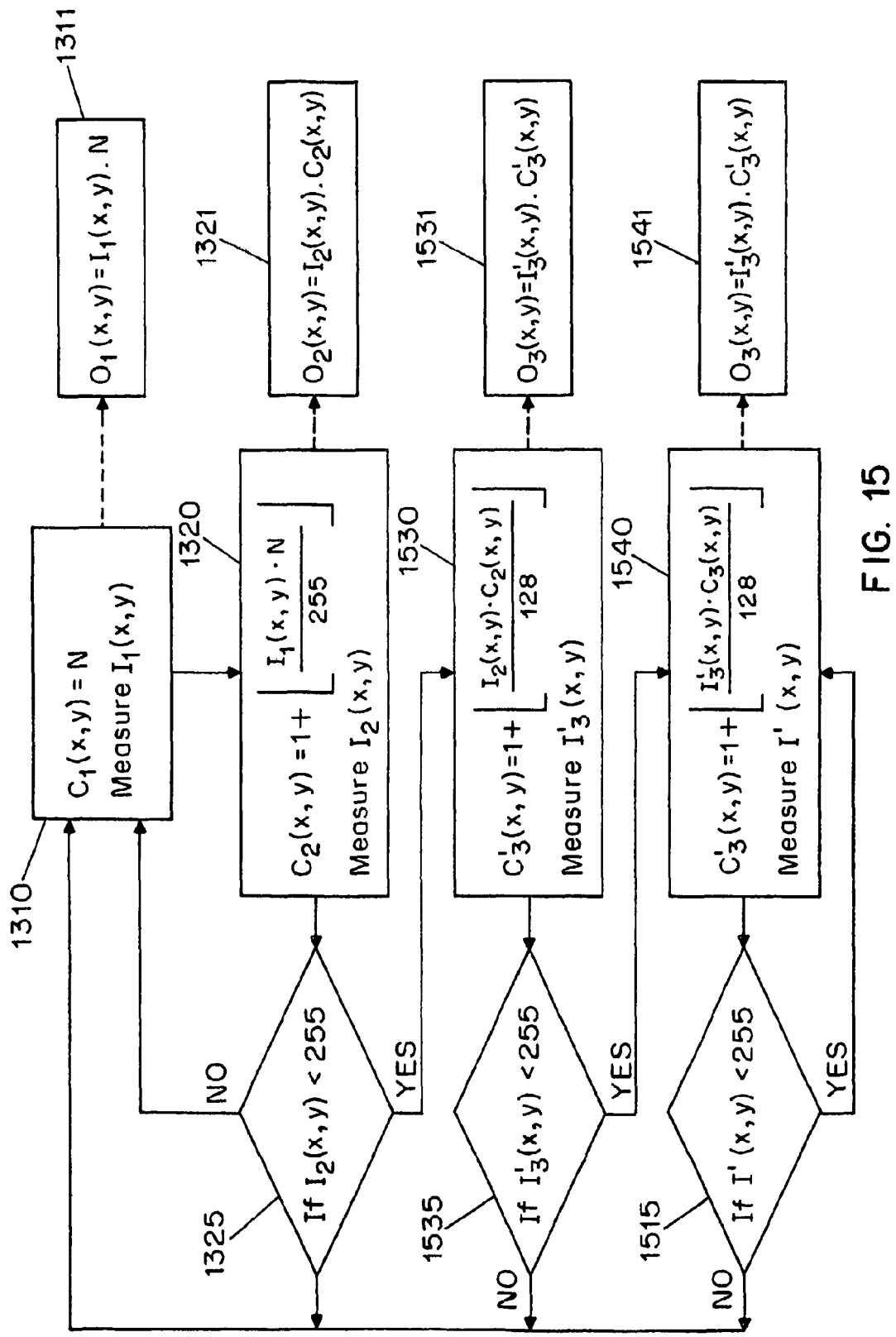
FIG. 15 is a flow diagram showing the continuos pixel control technique in accordance with an exemplary embodiment of the present invention.

Referring next to FIG. 15, a highly preferred technique for continuously adapting control of a single imaging sensor will next be explained. The technique is similar to that disclosed in connection with FIG. 13, except that the measurement at step 1330 is modified to become step 1530, an additional saturation determination 1535 is made after that third measurement 1530, and the parameters used for the third measurement are repeated for additional pixels 1540 unless a saturated pixel is determined 1545.

The method of FIG. 13 has the goal of finding the smallest control values (which produce smallest quantization separation), and therefore tends to produce image values near saturation. To reduce the frequency of saturation and thus the need to return to step 1310, step 1530 in FIG. 15 is modified as described in equation 12, by making the denominator in the computation a value less than 255:

$$C'_3(x, y) = \left\lfloor \frac{2 \cdot I_2(x, y) \cdot C_2(x, y)}{255} \right\rfloor + 1 \approx \left\lfloor \frac{2 \cdot I_2(x, y) \cdot I_1(x, y) \cdot N}{255 \cdot 255} \right\rfloor + 1 \quad (12)$$

$$\frac{I_3(x, y) + 1}{255} \cdot \frac{v \cdot C'_3(x, y)}{N} \geq s \geq \frac{I_3(x, y)}{255} \cdot \frac{v \cdot (C'_3(x, y) + 1))}{N}. \quad (13)$$

which has a quantization separation of $$\frac{v \cdot C'_3(x, y)}{255 \cdot N} \approx \frac{v \cdot 2 \cdot I_2(x, y) \cdot I_1(x, y)}{255 \cdot 255 \cdot 255} \quad (14)$$

The control method will converge to a value near that denominator, so in a compromise between frequency of resetting and the quantization error, the desired pixel measurement level is preferably set at 128. This is an example tradeoff between frequency of searching due to saturation and reduced dynamic range resolution. Values other than 128 provide alternative tradeoffs. In the initial step, or when saturation occurs, convergence speed is increased by using 255 as the initial denominator. Accordingly, rather than commencing at step 1310 for every pixel, this preferred embodiment uses a continuously adapting algorithm that only reverts to step 1310 when a pixel saturates.

Note while this is nearly twice the level of the quantization error of the primary control algorithm, the value of $I'_3$ is now expected to be nearly half that of $I_3$, and to stay well away from the saturation level. Saturation will occur only when brighter objects move into a pixels' coverage.

In the methods shown in FIGS. 13 and 15, the first step is set at the largest level, and hence, obtains the darkest measurable image. While this has the advantage that it avoids saturation and hence always yields an approximation, it has the disadvantage that the darker parts of the scene may yield poor initial approximations. An alternative is have an control algorithm that starts with the maximum exposure allowed and then adjusts the control levels for pixels that are too bright.

Figure 16:
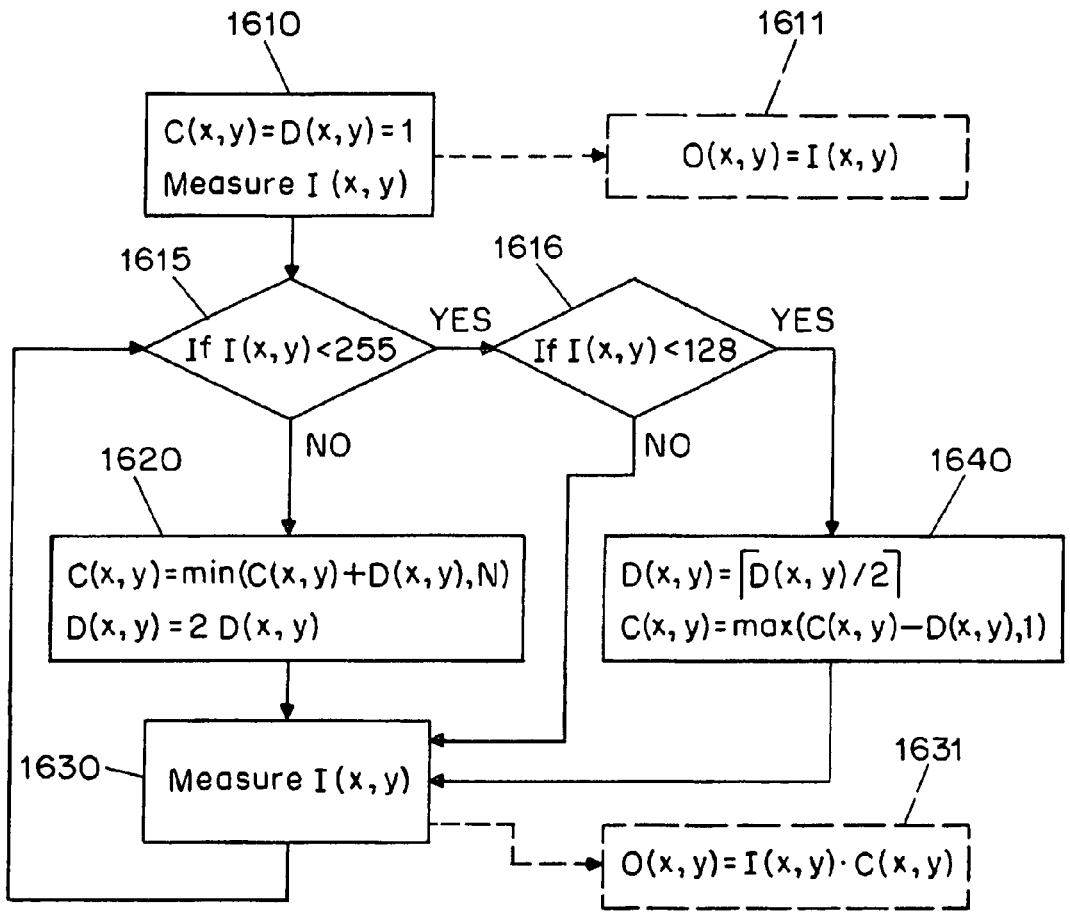
FIG. 16 is a flow diagram showing a searching control in accordance with an exemplary embodiment of the present invention.

Referring next to FIG. 16, an alternative control technique for a system which includes a single DMD and a single sensor, which utilizes searching control with saturation, will be explained. When a pixel saturates, an optimal setting for the next control level cannot be determined. Hence, the method performs a binary search, doubling the level added to the control signal for a pixel until it finds a level that does not saturate. To keep the quantization levels as small as possible, it proceeds to reduce the control signal via a search until the measured signal is approximately equal to 128.

As shown in FIG. 16, the control signal is initially set to 1, i.e., level 1, a measurement taken 1610, an output 1611 is made. Next, if the pixel image has a measured value of less than 255, 1615, and less than 128, 1616, then the image is too dark, the control signal is decreased 1640 by one-half of its current state, another measurement is made 1630 and an output generated 1631. If the pixel image is not saturated and is greater than 128, than it is in the desired range, and no change is made to the control signal prior to the next image measurement 1630. If the pixel in the image is saturated, the control signal is increased by its step size 1620, and a new measurement is made 1630.

The previous control techniques presume the desired output is simply the most accurate scene measurement available. There are applications where the user might desire to remap the intensity via some monotonic intensity function. Common examples are gamma correction, radiometric correction, and histogram equalization. The first two of these are pixel-wise computations, while the latter is a function of all the pixels in the image. While one could simply take the output image and remap the values as desired, by enforcing the remapping in the control algorithm, extra resolution in measurements is fostered.

Figure 17:
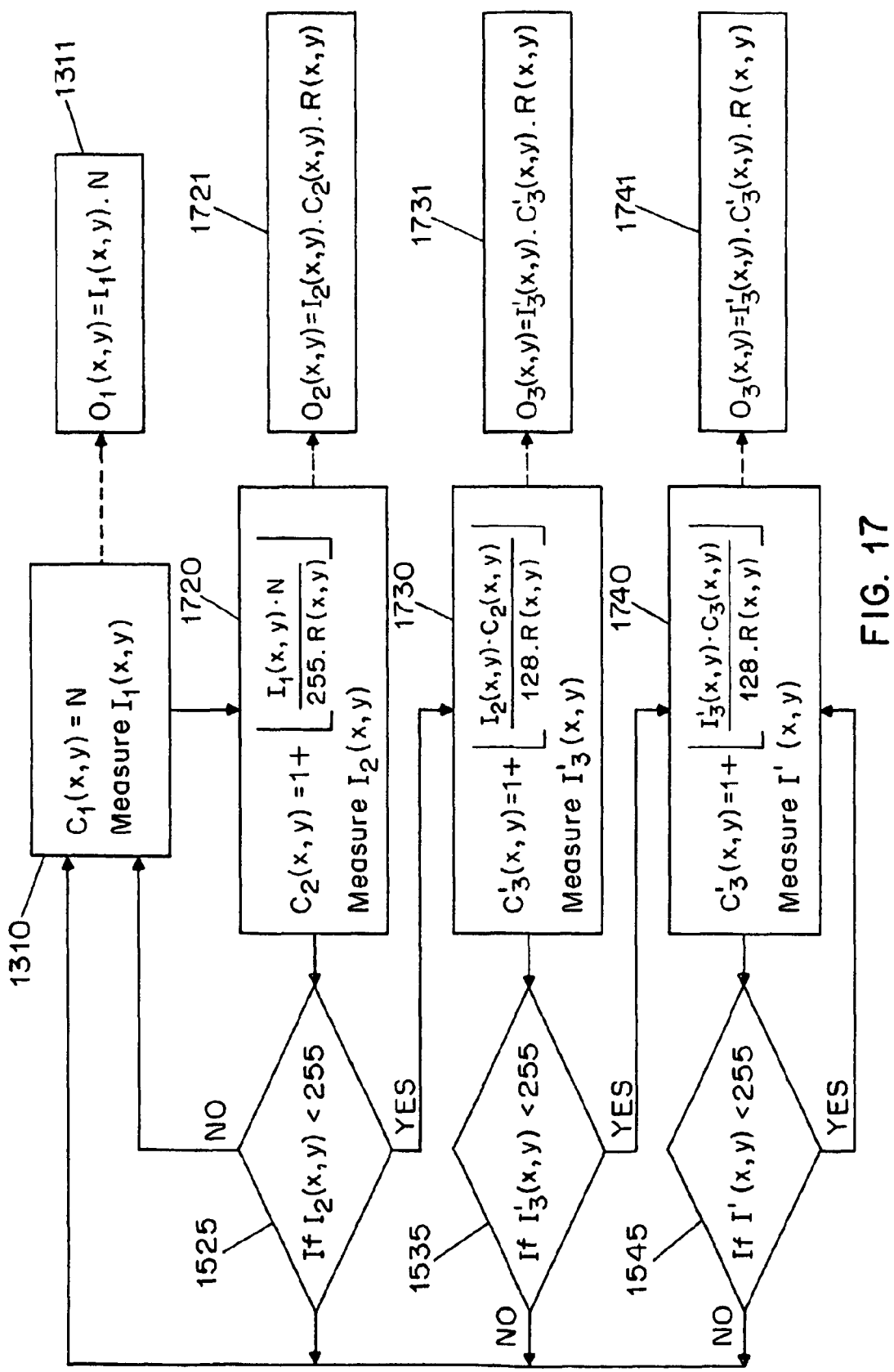
FIG. 17 is a flow diagram for controlling an intensity reweighting imaging in accordance with an exemplary embodiment of the present invention.

Referring next to FIG. 17, another alternative control technique for a system which includes a single DMD and a single sensor, which utilizes intensity remapping, will be explained. The technique is similar to that explained in connection with FIG. 15, except that it uses a secondary control image to hold the desired remapping value, $R(x, y)$ which scales the measurement to produce the output, thus modifying measurement steps 1320, 1530, and 1540 to 1720, 1730, and 1740, and resulting in output values 1721, 1731, 1741 $O(x, y)=I(x, y) \cdot C(x, y) \cdot R(x, y)$. For radiometric calibration or user-specified intensity correction, for example, vignetting correction, the map R can be precomputed and stored. Unlike the open-loop control, this technique will both correct for radiometric distortions and ensure that the resulting image does not saturate.

For the histogram equalization the reweighting map $R(x, y)$ needs to be recomputed for each image. To do this let H be the global histogram computed from the output O, quantized into V bins $H[0] \ldots H[V]$, where the brightness boundaries, $B[i]$ are defined such that each $H[j]$ has approximately the same number of pixels in it. Then $$R_h(x, y) = \frac{1}{k} \text{ where } O(x, y) \in H[k] \quad (15)$$

This scaling is applied to the control signal as shown in FIG. 17. For the histogram equalization this is a continuously adapting mapping and, as an inherently global remapping criterion, it may change when any part of the input changes.

The raw measurement image of the histogram equalization algorithm is not itself histogram equalized, the output image O(x,y)=I(x,y)*C(x,y), which is equalized in the full dynamic range, 0–N*255. If it is desired to have it normalized in the raw image space [0,255], this can be accomplished by having scaling $R_h(x, y)$ by 1/N. Given that a high dynamic range image is being computed, it may seem that software processing could produce the same result. However, the control will reduce the quantization error in the acquired data, before it is ever digitized. Note that histogram equalization has an added benefit that it can produce an image I(x, y) that will, when viewed directly, have enhanced dynamic range. By reading off the values in the control signal, the boundaries of this histogram are also determined.

In the control techniques described so far, the output image was computed from the product of the control signal and the measured images. While this produces the desired adaptive dynamic range and maximizes the measurement resolution per pixel, it requires that the output be computed in a digital sense and have a resolution beyond that of the standard resolution of a low level CCD or traditional 8-bit per channel display devices. To directly display the measurement in a human understandable requires another computation, which is undesirable.

An alternative is to control the system such that the measured image is still understandable while still maintaining the adaptive high dynamic range. To do this some of the measurement resolution must be sacrificed. Note that any mapping that produces a measured image that is monotonic in the scene measurement will be directly interpretable to a human viewer, including the histogram equalization mentioned in the previous section. As those skilled in the art will appreciate, there are numerous available methods for compressing the dynamic range of a signal, such as gamma compression. Any such dynamic range compression function can be incorporated into the above approach.

For example, to compute an arbitrary gamma correction applied to the measured range of intensity with a full automatic gain control we would set the control signal according to the following. First set k=the largest computer intensity value (I(x,y)*C(x,y)) in the previous frame. Then:

$$C(x, u) = \left\lfloor \left(\frac{O(x, y)}{k}\right)^\gamma \cdot \frac{N}{255} \right\rfloor + 1 \quad (16)$$

While they are scaled to be visible (and ordered) in the 8 bit range, the full values still can be computed. The digital outputs have the same wide dynamic range of the other control algorithms, but enforcing the order in the display significantly increases the quantization separations. It is still, however, far better quantization that could be obtained with a traditional camera.

Figure 18:
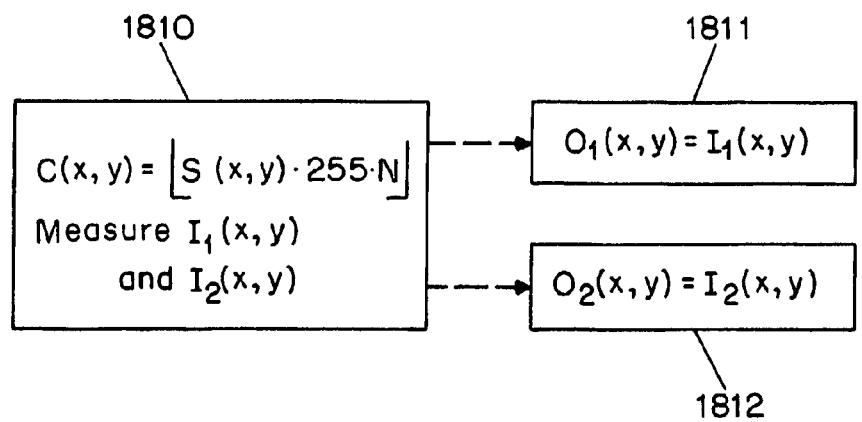
FIG. 18 is a flow diagram for controlling a spatially varying beam attenuator in accordance with an exemplary embodiment of the present invention.

Referring next to FIG. 18, a technique for implementing control of a dual image sensor system, such as that described in connection with FIG. 7, will be described. Open look control may be employed to control use of a sensor. While a constant image could be employed, it is preferable to use a spatially variable form of control, with the desired beam splitting being provided by the spatial splitting function, a spatial map S(x, y) 1810. For example, if S(x, y)=X, the measured image would have the fraction of incident light sent to a first sensor linearly varying from 0-1 across the image. The values in the spatial map are in the form of a desired percentage split, which is the fraction of the light that will be delivered to each output 1811, 1812, $O_1$(x, y). The output is then used to control the DMD.

In FIG. 18, the control algorithm shows the output images unsealed. This allows the raw 8-bit output on each channel. In this sensor the raw outputs could easily be analog NTSC output. If it is desired to have a constant variable beam splitter it would be trivial to a control which might be controlled by a knob. With a knob the analog position would be digitized to V set the single global control value for S(x, y)=V.

A technique for implementing closed loop control of a dual sensor system with a focused DMD, such as shown in FIG. 7, will next be explained. The dual sensor system has the advantage that two measurements are made in each time step. Similar to the case in the technique described in connection with FIG. 13, an initial image is captured with the control signal $C_1$(x, y)=N, except that now two images $I_1$(x, y) and $I_2$(x, y) are measured in the first step. If $I_1$(x, y)=255, then the measured scene brightness is outside the range of the measuring device, and the sensor saturates.

If $I_2$(x, y)<255 the associated scene energy, s, satisfies $$\frac{I_2(x, y) + 1}{255} \cdot \frac{v}{N} \geq s \geq \frac{I_2(x, y)}{255} \cdot \frac{v}{N} \quad (17)$$

which has a quantization separation of $$\frac{v}{255 \cdot N} \quad (18)$$

Note, that if $I_1$(x, y)=0 then $I_2$(x, y)<255 (presuming N>255 as it is expected to be). If $I_2$(x, y)<255, then $O_1$=$I_2$(x, y), then an accurate as possible measurement has been achieved with the instant configuration. Otherwise we set $O_1$=$I_1 \cdot C_1$(x, y), and the technique moves on to step 1320 where another two images, $I_3$(x, y) and $I_4$(x, y) are measured are measured.

The level of the control signal is set for the second time interval, $C_2$(x, y) to $$C_2(x, y) = \left\lfloor \frac{I_1(x, y) \cdot C_1(x, y)}{255} \right\rfloor = \left\lfloor \frac{I_1(x, y) \cdot N}{255 \cdot 255} \right\rfloor \quad (19)$$

which will result in measurement $I_3$(x, y) and $I_4$(x, y), where $$\frac{I_3(x, y) + 1}{255} \cdot \frac{v \cdot C_2(x, y)}{N} \geq s \geq \frac{I_3(x, y)}{255} \cdot \frac{v \cdot C_2(x, y)}{N} \quad (20)$$

which has a quantization separation of $$\frac{v \cdot C_2(x, y)}{N} \approx \frac{v \cdot \frac{I_1(x, y) \cdot N}{255}}{255 \cdot N} = \frac{v \cdot I_1(x, y)}{255 \cdot 255}. \quad (21)$$

Similarly, $$\frac{I_4(x, y) + 1}{255} \cdot \frac{v \cdot (N - C_2(x, y))}{N} \geq s \geq \frac{I_4(x, y)}{255} \cdot \frac{v \cdot (N - C_2(x, y))}{N} \quad (22)$$

which has a quantization separation of $$\frac{v \cdot (N - C_2(x, y))}{N} \approx \frac{v \cdot \frac{(255 - I_1(x, y)) \cdot N}{255}}{255 \cdot N} = \frac{v \cdot I_1(x, y)}{255 \cdot 255}. \quad (23)$$

By design of the control algorithm, if the scene has not changed brightness between steps 1310 and 1320, then $I_3(x, y) < 255$. If $I_4(x, y) = 255$ then the output is $O_2 = I_3(x, y) \cdot C_2(x, y)$. If however $I_4(x, y) < 255$, then the output is:

$$O_2 = \left\lfloor \frac{I_3(x, y) \cdot C_2(x, y) + I_4(x, y) \cdot (N - C_2(x, y))}{2} \right\rfloor \quad (24)$$

This results in a two-step control algorithm, rather than the three-step control algorithm of FIG. 15.

As in the one chip case, this control technique can be directly applied to a single chip color camera. Given pixel level alignment, the method applies directly; without alignment the image measurements must be interpolated to provide approximations of the color measurements at each position before apply the control method can be applied.

Next, a more generalized technique for implementing control of an N CCD sensor system with a focused DMD will be explained. Control of a system using three or more sensors focused on a DMD is similar to control of a single sensor system, except that care must be taken to insure that no image is saturated. If the first image is captured using $C_1(x, y) = N$ and measured, say $I_{R1}(x, y), I_{G1}(x, y), I_{B1}(x, y)$ for an RGB sensor, then the control for the second image will be:

$$I_{m1}(x,y) = \max(I_{R1}(x,y), I_{G1}(x,y), I_{B1}(x,y)) \quad (25)$$

with $C_2(x, y)$ set to $$C_2(x, y) = \left\lfloor \frac{I_{m1}(x, y) \cdot C_1(x, y)}{255} \right\rfloor + 1 = \left\lfloor \frac{I_{m1}(x, y) \cdot N}{255} \right\rfloor + 1 \quad (26)$$

In a similar manner, $$I_{m2}(x,y) = \max(I_{R2}(x,y), I_{G2}(x,y), I_{B2}(x,y)) \quad (27)$$

can make the final measurement. This approach of computing a pixel-wise maximum of the input channels and using it to control the next level also applies to the sensor where there are CCD sensors on both sides of the DMD, as in FIG. 7, with the understood modifications to equation 19 above.

Figure 19:
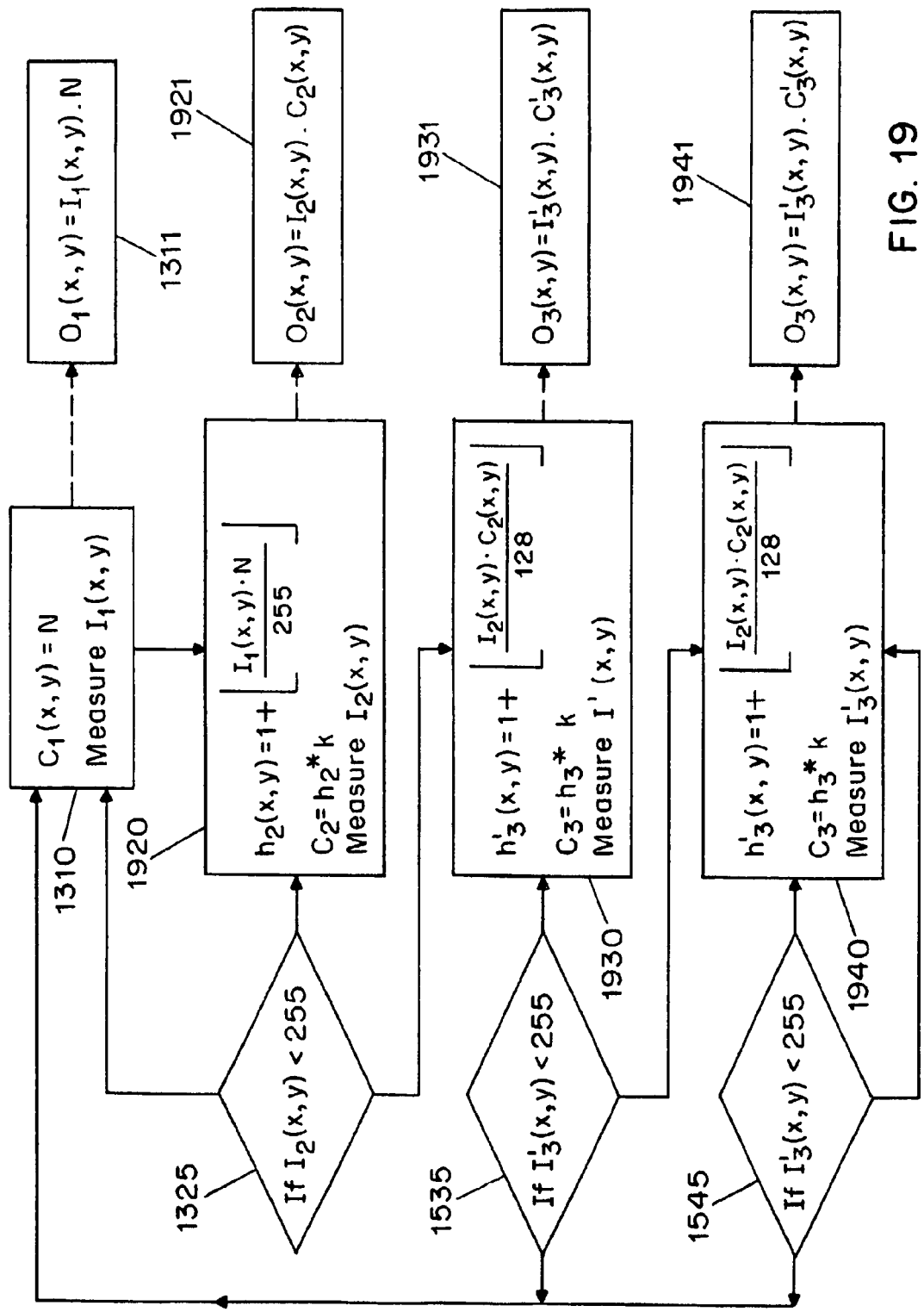
FIG. 19 is a flow diagram for controlling an unfocused image in accordance with an exemplary embodiment of the present invention.

Referring next to FIG. 19, a technique for implementing control of a single CCD sensor with an unfocused image on a DMD will be explained. The technique is similar to that explained in connection with FIG. 15, except that it uses a high resolution secondary control signal which scales the measurement to produce the output, thus modifying measurement steps 1320, 1530, and 1540 to 1920, 1930, and 1940, and resulting in output values 1921, 1931, 1941 O(x, y)=I(x, y)·C(x, y)·R(x, y). With an unfocused image on the DMD, the brightness of each pixel can not be independently controlled via direct means. Because the image is defocused, the energy falling on one mirror facet will not necessarily end up on a single pixel on the sensor, as the bundle of rays will spread out over neighboring pixels.

As shown in FIG. 19, this control is based on first computing a high resolution control signal as in the focused case, and then the control signal is de-convolved with a kernel k. The choice of the convolution kernel k (both fall off and width) is a function of the level of defocusing expected on the DMD.

Next, the problem of quantization error will be addressed. In almost any of the above control techniques, there is a range of settings such that the measured intensity image will not be not saturated. Each setting will yield an approximation of the scene energy. While most of the control algorithms attempt to produce as accurate an approximation as possible from a single measured frame, it is also possible, for scene points that do not change quickly, to obtain even better estimates by using a control algorithm that uses multiple different control values.

In a standard camera, temporal averaging cannot decrease the quantization separation (though it can reduce camera noise) because the scaling of the scene energy is fixed. However, most of the above-described control algorithms can provide different scalings, yielding multiple approximations. An improved algorithm could combine these results to provide a more accurate estimate. In a noiseless case, multiple approximations can be combined:

$$\begin{aligned} O_1, l &= I_1(x, y) \cdot C_1(x, y); & O_1, r &= (I_1(x, y) + 1) \cdot C_1(x, y) \\ O_2, l &= I_2(x, y) \cdot C_2(x, y); & O_2, r &= (I_2(x, y) + 1) \cdot C_2(x, y) \\ &\vdots & &\vdots \\ O_p, l &= I_p(x, y) \cdot C_p(x, y); & O_p, r &= (I_p(x, y) + 1) \cdot C_p(x, y) \end{aligned} \quad (28)$$

$$O' = \frac{1}{2}(\max_i O_i, l + \min_i O_i, r)$$

For example, presuming the measurement of a point whose true scene energy should be represented as 24311, requiring 16 bits for representation, but only 8 bit sensors are used which claim their value downward, control signals of 112, 128, 168 could be used and for which that ideal sensor would return measurements of 217, 189, 172.

$$\begin{aligned} O_1, l &= 217 * 112 = 24303; & O_1, r &= 218 * 112 = 24416 \\ O_2, l &= 189 * 128 = 24192; & O_2, r &= 190 * 128 = 24320 \\ O_3, l &= 144 * 168 = 24192; & O_3, r &= 145 * 168 = 24360 \end{aligned} \quad (29)$$

$$O' = \frac{1}{2}\max_i O_i, l + \min_i O_i, r = \frac{1}{2}(24303 + 24320) = 24311.50$$

which has an error of only 0.5, whereas taking $\frac{1}{2} O_i, l + O_i, r$ yields a error of at 35 for each individual measurement. In the more general noisy measurement case, someone skilled in the art will recognize that there are various algorithms for combining multiple noisy approximations, e.g. a mean weighted by the expected error given the imaging sensor's noise model.

The control techniques described above may be implemented in either hardware or software. For several reasons unrelated to the techniques themselves, e.g. to ensure a sharp CCD image, it may be advantageous for the sensor system to be linked to a digital signal processor ("DSP"), and thus such a hardware platform may be preferable. With the exception of the control flow for unfocused images and the control for histogram equalization, the remaining control flow techniques are all pointwise independent allowing them to computed as the DSP processes in measured image in scan line order. For unfocused system the system would need to buffer sufficient lines to implement the convolution. For the histogram equalization it would need to store the histogram in a buffer. In each case it is anticipated that the control signal C(x, y) would be stored digitally and used to provide the control signal to the DMB. By using dual ported memory this control signal could be read by the DMD controller while a new control signal is being computed. Since the signal is computed pixel-wise, the timing of these updated would not need to be synchronized.

Alternatively, the control techniques may be realized in software on an external computation platform, e.g. a PC connected to a frame-grabber that is providing the intensity measurements. The control signal would then be provided to the DMD by considering the control signal as a "display" signal and using the existing circuit developed for DMD control. such an implementation, the signal should be encoded using the first 8 bits of the control signal encoded as the desired intensity for the green channel G, with red and blue channel either 0 or 255, depending on highest two bits of the control signal.

Figure 20:
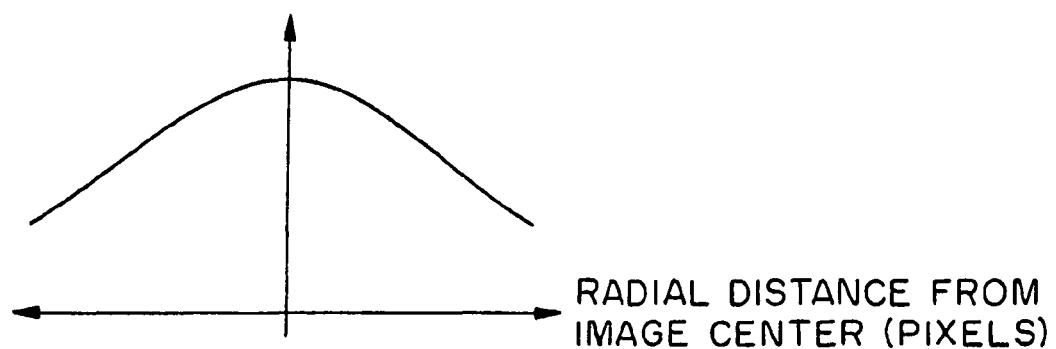
FIG. 20 is a graph plotting radial distance against brightness and a compensation control signal.
Figure 20:
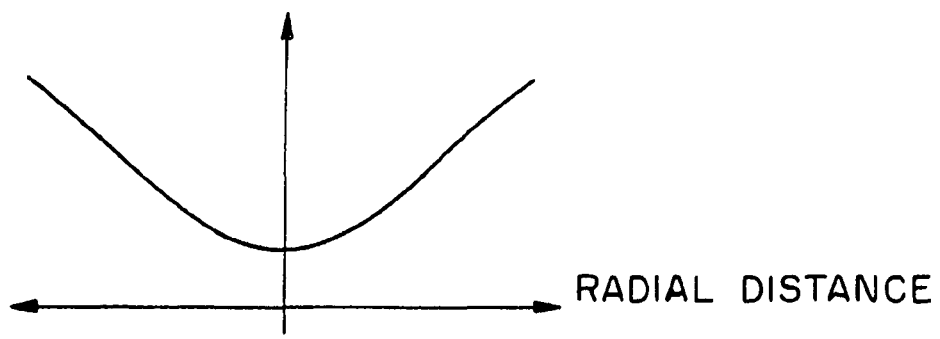
Figure 21:
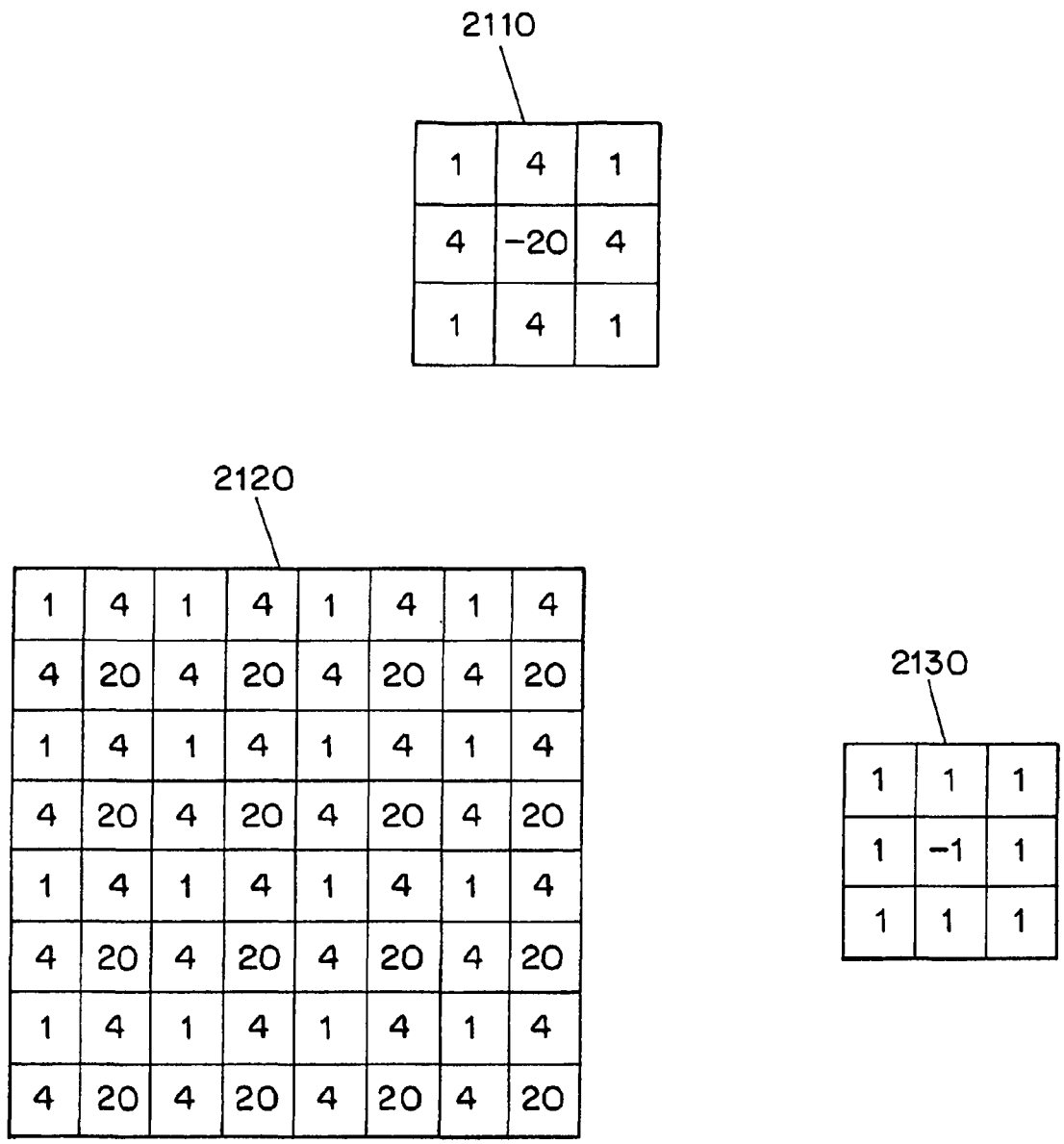
FIG. 21 is an illustrative diagram showing filters in accordance with an exemplary embodiment of the present invention.
Figure 22:
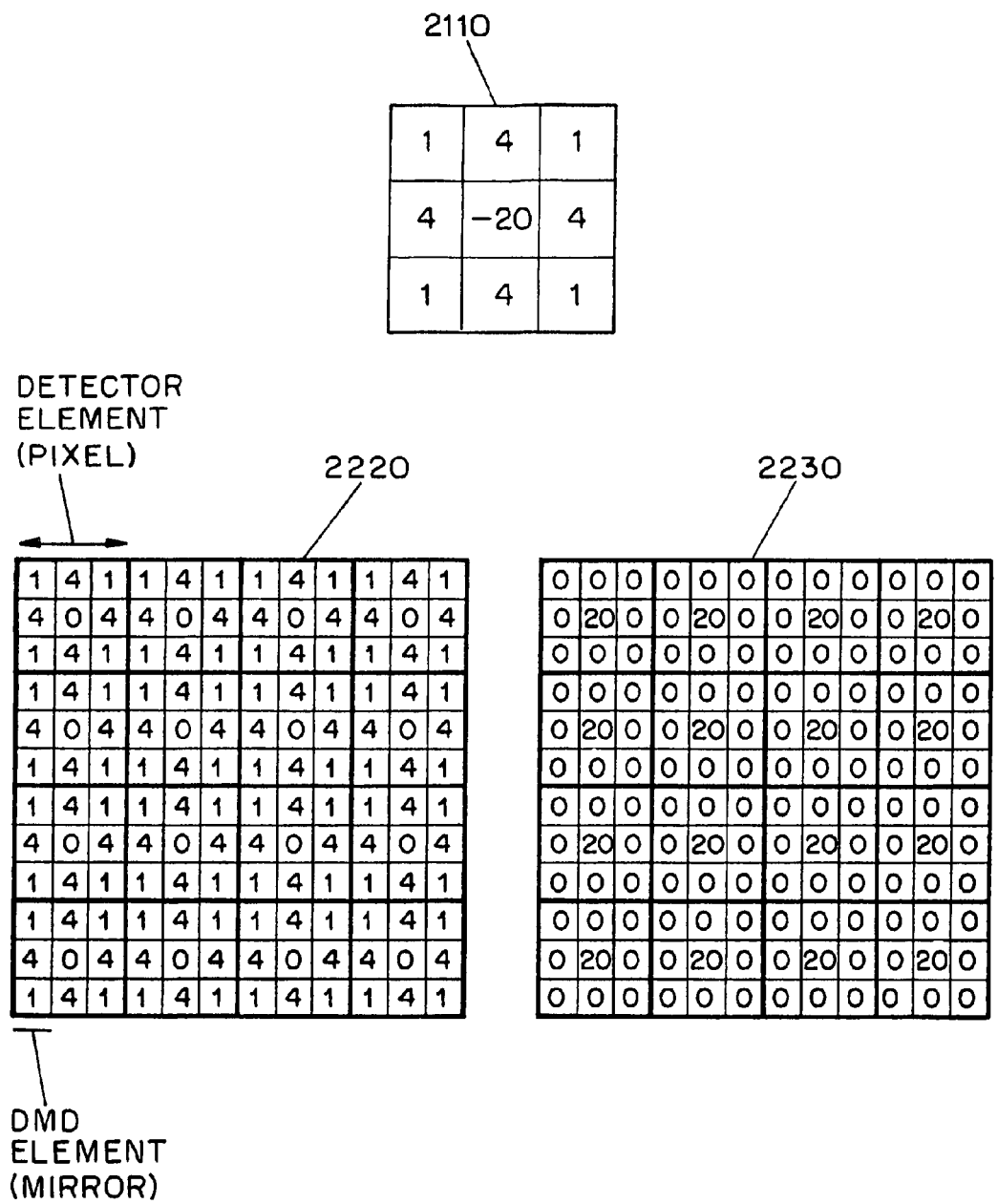
FIG. 22 is an illustrative diagram showing filters in accordance with an exemplary embodiment of the present invention.

Referring next to FIGS. 20-22, image compensation and filtering will be explained. Spatial image modulation has strong implications for image processing in general. Thus far, only adaptive imaging techniques that use a feedback control loop (see FIG. 1) to enable the imaging system to adapt to scene appearance have been addressed. However, many useful operations can also be achieved using an open loop system.

For instance, a captured image is often compensated for undesirable radiometric effects. Examples of such effects are the "cosine to the power of four" fall-off found in many imaging systems, brightness decay towards the edge of the field of view due to lens vignetting, variations in pixel sensitivities due to defects, etc. In such cases, a DMD modulator can be given a "compensation" control image that results in optical compensation for the above effects.

The radiometric fall-off function and the corresponding control image are illustrated in FIG. 20. In other cases, for visual monitoring purposes, it may be useful to enhance (highlight) certain regions of the image. Here again, appropriate controls images can be used to accomplish this in real-time without the need for computations. Also, compensation schemes can also be made adaptive by incorporating them into closed-loop control. For instance, if moving regions in scene need to be highlight, a simple motion detector can be applied to the captured image and the regions of interest can be modulated appropriately.

Other implications exist for image processing. The most common operation in image processing is the convolution of the image using a "mask" or a "filter." Here again, a significant portion of the computations involved can be done optically using spatial modulation.

As an example, consider the popular Laplacian filter kernel 2110 shown in FIG. 21. This operator is often used to find edges and extract the high frequency components in images. If the control image 2120 shown in FIG. 21 is applied to a DMD, each scene radiance gets multiplied by the corresponding control image value. By applying the (3×3) computational kernel 2130 shown to non-overlapping 3×3 windows in the captured image, the Laplacian value for the pixel at the center of each of these 3×3 windows is obtained. Such an approach has significant computational benefits; the computational kernel shown on the right only includes 1's and −1's. Therefore, the result is obtained by simply addition and subtraction operations applied to the captured image. That is, all the multiplications (which are significantly more computationally expensive than additions and subtractions) are done optically by the modulator.

As another example, in the system of FIG. 5, the DMD may be of a significantly higher resolution than the image detector. In such cases, interesting filtering/processing functions can be performed at an intra-pixel level, as illustrated in FIG. 22.

For instance, the spatial response function of each pixel can be varied. Pixels typically serve as buckets that collect photons. Intra-pixel control therefore enables control of the light gathering properties of these buckets. For instance, one may apply a derivative filter, such as the Laplacian filter, to the light cone. Since such operations typically involve applying kernels that have both positive and negative elements, the kernel may be implemented using two optical kernels 2220, 2230 that are both positive (one with the positive elements of the original kernel and zeroes everywhere else, and the other with the negative elements of the original kernel and zeroes everywhere else). The two pixel measurements obtained by applied the two optical kernels are then subtracted to obtain the final result. This final result has a resolution that cannot be achieved using traditional digital image processing methods. Any computational filter has a finite support associated with it (it spans a neighborhood in the image). This severely limits the resolution of the computed result. In the implementation shown in FIG. 22, the support width of kernel is a single pixel. Therefore, the computed kernel output has very high spatial resolution.

This approach can also be used to alter the spatial sensitivity characteristics of individual pixels on the image detector. For instance, by using a simple 3×3 Gaussian-like filter one can shape the spatial sensitivity of each pixel to be more Gaussian like (greater sensitivity to light falling in the center of the pixel).

Note that these super-resolution filtering operations can benefit from the multiple detector configuration shown in FIG. 7; in this case, the two detectors simultaneously capture images that correspond to the results of applying a positive filter f(x, y) and its complementary filter 1−f(x, y). Therefore f(x, y) may be selecting such that it and its complement can be used together to realize more interesting filters.

The foregoing merely illustrates the principles of the invention. Various modifications and alterations to the described embodiments will be apparent to those skilled in the art in view of the teachings herein. For example, while the above description assumes imaging in the visible light spectrum domain, the adaptive imaging methods are directly applicable to imaging of any form electromagnetic radiation, including radar, infra-red, near infra-red, and X-ray. It will thus be appreciated that those skilled in the art will be able to devise numerous systems and methods which, although not explicitly shown or described herein, embody the principles of the invention and are thus within the spirit and scope of the invention.

The invention claimed is:

1. A system for adaptively imaging a scene, comprising:
 a digital light processing apparatus adapted for controllably reflecting at least first and second images of said scene in at least a first direction based on control data to thereby generate corresponding first and second intensity modulated images of said scene;
 an image detector, optically coupled to said digital light processing apparatus along said first direction of reflection, for detecting said first and second intensity modulated images corresponding to said at least first and second images of said scene and generating first and second detected image data corresponding to said at least first and second images; and an image data processor, coupled to said image detector and receiving said first and second detected image data therefrom, and coupled to said digital light processing apparatus, for processing said first detected image data into first control data, providing said first control data to said digital light processing apparatus for adaptive control thereof, and generating output image data from said second detected image data and said first control data, said output image data having a quality greater than said first detected image data or said second detected image data.

2. The system of claim 1, wherein said digital light processing apparatus comprises a digital micromirror device.

3. The system of claim 2, further comprising an image focusing device, optically coupled to said scene and said digital micromirror device and positioned therebetween, for focusing said at least first and second images of said scene onto said digital light processing apparatus.

4. The system of claim 3, wherein said image focusing device comprises a lens.

5. The system of claim 2, further comprising an image focusing device, optically coupled to said image detector and said digital micromirror device and positioned therebetween, for focusing said first and second intensity modulated images of said scene onto said image detector.

6. The system of claim 5, wherein said image focusing device comprises a lens.

7. The system of claim 6, wherein said image detector comprises a CCD camera.

8. The system of claim 2, wherein said image data processor comprises a general purpose computer including software for processing said first detected image data into said first control data; providing said first control data to said digital micromirror device, and generating said output image data from said second detected image data and said first control data.

9. The system of claim 1, further comprising a second image detector, optically coupled to said digital light processing apparatus along a second direction of reflection therefrom and adapted for receiving further intensity modulated images of said scene therefrom, for detecting said further intensity modulated images of said scene and generating corresponding further detected image data, and wherein said image data processor is further coupled to said second image detector for receiving said further detected image data therefrom, and adapted for processing said second detected image data into second control data.

10. The system of claim 1, further comprising a beam splitter, optically coupled to said digital light processing apparatus along said first direction of reflection, for splitting said intensity modulated images therefrom into a partial transmission and a partial reflection, wherein said image detector is optically coupled to said beam splitter along a direction of said partial transmission, and a second image detector is optically coupled to said beam splitter along a direction of said partial reflection for detecting said intensity modulated images of said scene along said direction of partial reflection and generating corresponding detected image data, and wherein said image data processor is further coupled to said second image detector for receiving said corresponding detected image data therefrom, and adapted for processing said corresponding detected image data into second control data.

11. The system of claim 1, further comprising a second digital light processing apparatus adapted for controllably reflecting said first and second intensity modulated images of said scene in at least a second direction, optically coupled to said digital light processing apparatus along said first direction of reflection thereof, wherein said image detector is optically coupled to said second digital light processing apparatus through said second direction of reflection from said second digital light processing apparatus.

12. The system of claim 11, further comprising a second image detector, wherein said second image detector is optically coupled to said second digital light processing apparatus through a further direction of reflection from said second digital light processing apparatus.

13. A system for adaptively imaging a scene, comprising:

a digital light processing apparatus adapted for controllably reflecting at least first and second images of said scene in at least a first direction based on control data to thereby generate corresponding first and second intensity modulated images of said scene;

an image focusing device, optically coupled to said scene and said digital light processing apparatus and positioned therebetween, for focusing said first and second images of said scene onto said digital light processing apparatus;

an image detector, optically coupled to said digital light processing apparatus along said first direction of reflection, for detecting said first and second intensity modulated images of said scene and generating first and second detected image data; and an image data processor, coupled to said image detector and receiving said first and second detected image data therefrom, and coupled to said digital light processing apparatus, for processing said first detected image data into first control data, providing said first control data to said digital light processing apparatus for adaptive control thereof, generating output image data from said second detected image data and said first control data, and processing said output image data with filter data to generate final image data.

14. The system of claim 13, wherein said controllable digital light processing apparatus comprises a digital micromirror device.

15. The system of claim 14, wherein said image focusing device comprises a lens.

16. The system of claim 14, further comprising a second image focusing device, optically coupled to said image detector and said digital micromirror device and positioned therebetween, for focusing said first and second intensity modulated images of said scene onto said image detector.

17. The system of claim 16, wherein said second image focusing device comprises a lens.

18. The system of claim 17, wherein said image detector comprises a CCD camera.

19. The system of claim 13, wherein said filter data comprises Laplacian filter data.

20. The system of claim 13, wherein said filter data comprises first and second optical kernel data.

21. A method for controlling adaptive imaging of a scene using an N-level digital light processing apparatus adapted for controllably reflecting at least first and second images of said scene in at least a first direction to thereby generate corresponding intensity modulated images of said scene along at least said first direction, comprising:

setting a digital light processing apparatus control signal corresponding to said scene to an initial level N;

taking a first measurement of scene energy at one or more pixels corresponding to at least a portion of said scene using said initial control signal;

revising said digital light processing apparatus control signal to a second level using said first measurement and a secondary control value, the secondary control value based at least in part on a level of defocusing of the digital light processing apparatus;

taking a second measurement of scene energy at said one or more pixels using said revised control signal; and generating an output image using said second measurement of scene energy and said revised control signal, said output image having a quality greater than the first measurement of scene energy or the second measurement of scene energy.

22. The method of claim 21, further comprising:
comparing said second measurement with a threshold value;
updating said digital light processing apparatus control signal to a third level based on said comparison of said second measurement;
taking a third measurement of scene energy at said one or more pixels using said updated control signal; and
generating said output image using said third measurement of scene energy and said updated control signal, said output image having a quality greater than the second measurement of scene energy or the third measurement of scene energy.

23. The method of claim 22, wherein taking said measurements of scene energy at said one or more pixels comprises taking said measurements of scene energy at a first group of one or more pixels and a second group of one or more pixels, said second group comprising one or more pixels corresponding to a different portion of said scene from said first group.

24. The method of claim 23, further comprising:
comparing any most recent measurements with a threshold value;
updating said digital light processing apparatus control signals to one or more new levels using said comparisons of said any most recent measurements;
taking additional measurements of scene energy at said first and second groups of one or more pixels using said updated control signals updated using said comparisons of said any most recent measurements; and
generating said output image using said additional measurements of scene energy and said updated control signals, said output image having a quality greater than said additional measurements of scene energy.

25. The method of claim 21, further comprising determining whether said first measurement is below a first threshold value and if said first measurement is below said threshold value, determining whether said first measurement is below a second threshold value; and wherein revising said digital light processing apparatus control signal comprises revising said digital light processing apparatus control signal to a lower second level if said first measurement is determined to not be below said first threshold value, to a higher second level if said first measurement is determined to be below said first threshold value and below said second threshold value, and to the same second level if said first measurement is determined to be below said first threshold value and not below said second threshold value.

26. The method of claim 21, wherein revising said digital light processing apparatus control signal comprises revising said digital light processing apparatus control signal to the second level using said first measurement and a remapping value.

27. The method of claim 26, wherein said one or more pixels comprises a first group of one or more pixels and a second group of one or more pixels, said second group comprising one or more pixels corresponding to a different portion of said scene as said first group, the method further comprising:
comparing said second measurement to a threshold value;
updating said digital light processing apparatus control signal to a third level using said remapping value and said comparison of said second measurement;
taking a third measurement of scene energy at said one or more pixels using said updated control signal;
comparing any most recent measurements with a further threshold value;
updating said digital light processing apparatus control signals to one or more new levels using said remapping value and said comparisons of said any most recent measurements;
taking additional measurements of scene energy at said two or more groups of one or more pixels using said updated control signals updated using said comparisons of said any most recent measurements; and
generating said output image using said additional measurements of scene energy and said updated control signals, said output image having a quality greater than said additional measurements of scene energy.

28. The method of claim 21, wherein said one or more pixels comprises a first group of one or more pixels and a second group of one or more pixels, said second group comprising one or more pixels corresponding to a different portion of said scene as said first group, the method further comprising:
comparing said second measurement to a threshold value;
updating said digital light processing apparatus control signal to a third level using said secondary control value and said comparison of said second measurement;
taking a third measurement of scene energy at said one or more pixels using said updated control signal;
comparing any most recent measurements with a further threshold value;
updating said digital light processing apparatus control signals to one or more new levels using said secondary control value and said comparisons of any most recent measurements;
taking additional measurements of scene energy at said first and second groups of one or more pixels using said updated control signals updated using said comparisons of said any most recent measurements; and
generating said output image using said additional measurements of scene energy and said updated control signals, said output image having a quality greater than said additional measurements of scene energy.

29. The method of claim 21, wherein said first measurement includes first measurements from at least two differently positioned sensors and said second measurement includes second measurements from said at least two differently positioned sensors.

30. The method of claim 21, wherein said initial digital light processing apparatus control signal includes two or more control signals and said revised digital light processing apparatus control signal includes two or more control signals.

31. A method for controlling adaptive imaging of a scene using an N-level digital light processing apparatus adapted for controllably reflecting an image of said scene in at least a first direction to thereby generate corresponding intensity modulated images of said scene, comprising:

setting a digital light processing apparatus control signal corresponding to a portion of said scene to an initial level N;

taking a measurement of scene energy at one or more points corresponding to said scene using said initial control signal;

convolving said measurement with filter data, said filter data comprising Laplacian filter data; and revising said digital light processing apparatus control signal to a second level using said convolution of said measurement and said filter data.

32. A method for controlling adaptive imaging of a scene using an N-level digital light processing apparatus adapted for controllably reflecting an image of said scene in at least a first direction to thereby generate corresponding intensity modulated images of said scene, comprising:

setting a digital light processing apparatus control signal corresponding to a portion of said scene to an initial level N;

taking a measurement of scene energy at one or more points corresponding to said scene using said initial control signal;

convolving said measurement with filter data;

revising said digital light processing apparatus control signal to a second level using said convolution of said measurement and said filter data;

convolving said measurement with second filter data; and determining a final image from said convolution of said measurement with said filter data and said convolution of said measurement with said second filter data.

33. The method of claim 32, wherein said filter data comprises first optical kernel data and said second filter data comprises second optical kernel data.

* * * * *